(12) United States Patent
Masurekar et al.

(10) Patent No.: US 11,855,959 B2
(45) Date of Patent: Dec. 26, 2023

(54) IMPLEMENTING LOGICAL DHCP SERVERS IN LOGICAL NETWORKS

(71) Applicant: Nicira, Inc., Palo Alto, CA (US)

(72) Inventors: Uday Masurekar, Sunnyvale, CA (US); Jayant Jain, Cupertino, CA (US); Ronghua Zhang, San Jose, CA (US); Mani Kancherla, Cupertino, CA (US); Minjal Agarwal, Santa Clara, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 17/079,461

(22) Filed: Oct. 24, 2020

(65) Prior Publication Data

US 2021/0058365 A1 Feb. 25, 2021

Related U.S. Application Data

(63) Continuation of application No. 15/420,070, filed on Jan. 30, 2017, now Pat. No. 10,841,273.

(Continued)

(51) Int. Cl.
*H04L 61/5014* (2022.01)
*H04L 41/12* (2022.01)
(Continued)

(52) U.S. Cl.
CPC .......... *H04L 61/5014* (2022.05); *H04L 41/12* (2013.01); *H04L 61/5061* (2022.05); *H04L 2101/668* (2022.05)

(58) Field of Classification Search
CPC . H04L 41/12; H04L 61/2015; H04L 61/2061; H04L 61/6068; H04L 61/103;
(Continued)

(56) References Cited

U.S. PATENT DOCUMENTS 5,504,921 A 4/1996 Dev et al.
5,550,816 A 8/1996 Hardwick et al.
(Continued)

FOREIGN PATENT DOCUMENTS

CN 101677291 A 3/2010
CN 102710814 A 10/2012
(Continued)

OTHER PUBLICATIONS

Author Unknown, "What is a Logical Network?," Feb. 2010, 3 pages, retrieved from https://searchnetworking.techtarget.com/definition/logical-network.

(Continued)

*Primary Examiner* — Greg C Bengzon
(74) *Attorney, Agent, or Firm* — ADELI LLP

(57) ABSTRACT

Some embodiments provide a method for providing dynamic host configuration protocol (DHCP) services to different data compute nodes (e.g., virtual machines) that belong to different logical networks (e.g., for different tenants in a datacenter). In some embodiments, the method inserts a logical network identifier (LNI) value to each DHCP packet and forwards the packet to a DHCP server module for processing the DHCP request. Based on the LNI value, the DHCP server of some embodiments identifies the logical network from which the DHCP packet is received. The DHCP server then provides the requested DHCP service (e.g., assigning an IP address to a data compute node that has originated the DHCP packet, assigning a domain name, etc.) according to a DHCP service configuration for the identified logical network.

22 Claims, 9 Drawing Sheets

Related U.S. Application Data

(60) Provisional application No. 62/329,958, filed on Apr. 29, 2016.

(51) Int. Cl.
*H04L 61/5061* (2022.01)
*H04L 101/668* (2022.01)

(58) Field of Classification Search
CPC ....... H04L 45/586; H04L 45/64; H04L 12/18; H04L 12/4633; H04L 29/12066; H04L 29/12226; H04L 29/12264; H04L 29/12839; H04L 41/082; H04L 41/22; H04L 43/0811; H04L 43/50; H04L 45/02; H04L 45/12; H04L 45/16; H04L 45/18; H04L 45/20; H04L 45/28; H04L 45/48; H04L 49/201; H04L 49/25; H04L 5/0016; H04L 61/1511; H04L 61/2007; H04L 61/2046; H04L 61/6004; H04L 61/6022; H04L 63/0236; H04L 63/08; H04L 63/10; H04L 63/102; H04L 63/1441; H04L 63/162; H04L 63/164; H04L 69/22; G06F 2009/45595; G06F 9/44505; G06F 9/455; H04W 24/02; H04W 24/08; H04W 28/08; H04W 36/0011; H04W 36/08; H04W 84/12; H04W 88/16

See application file for complete search history.

(56) References Cited

U.S. PATENT DOCUMENTS

| | | | |
|---|---|---|---|
| 5,751,967 A | 5/1998 | Raab et al. | |
| 6,006,275 A | 12/1999 | Picazo et al. | |
| 6,104,699 A | 8/2000 | Holender et al. | |
| 6,205,118 B1 | 3/2001 | Rathnavelu | |
| 6,219,699 B1 | 4/2001 | McCloghrie et al. | |
| 6,359,909 B1 | 3/2002 | Ito et al. | |
| 6,456,624 B1 | 9/2002 | Eccles et al. | |
| 6,512,745 B1 | 1/2003 | Abe et al. | |
| 6,539,432 B1 | 3/2003 | Taguchi et al. | |
| 6,680,934 B1 | 1/2004 | Cair | |
| 6,785,843 B1 | 8/2004 | McRae et al. | |
| 6,941,487 B1 | 9/2005 | Balakrishnan et al. | |
| 6,950,428 B1 | 9/2005 | Horst et al. | |
| 6,963,585 B1 | 11/2005 | Pennec et al. | |
| 6,999,454 B1 | 2/2006 | Crump | |
| 7,046,630 B2 | 5/2006 | Abe et al. | |
| 7,152,117 B1* | 12/2006 | Stapp ............... H04L 29/12273 709/245 |
| 7,197,572 B2 | 3/2007 | Matters et al. | |
| 7,200,144 B2 | 4/2007 | Terrell et al. | |
| 7,209,439 B2 | 4/2007 | Rawlins et al. | |
| 7,231,660 B1 | 6/2007 | Daude et al. | |
| 7,260,648 B2 | 8/2007 | Tingley et al. | |
| 7,283,473 B2 | 10/2007 | Arndt et al. | |
| 7,342,916 B2 | 3/2008 | Das et al. | |
| 7,391,771 B2 | 6/2008 | Orava et al. | |
| 7,450,598 B2 | 11/2008 | Chen et al. | |
| 7,463,579 B2 | 12/2008 | Lapuh et al. | |
| 7,478,173 B1 | 1/2009 | Delco | |
| 7,483,411 B2 | 1/2009 | Weinstein et al. | |
| 7,542,468 B1 | 6/2009 | Begley et al. | |
| 7,555,002 B2 | 6/2009 | Arndt et al. | |
| 7,606,260 B2 | 10/2009 | Oguchi et al. | |
| 7,643,488 B2 | 1/2010 | Khanna et al. | |
| 7,649,851 B2 | 1/2010 | Takashige et al. | |
| 7,710,874 B2 | 5/2010 | Balakrishnan et al. | |
| 7,764,599 B2 | 7/2010 | Doi et al. | |
| 7,792,987 B1 | 9/2010 | Vohra et al. | |
| 7,814,541 B1 | 10/2010 | Manvi | |
| 7,818,452 B2 | 10/2010 | Matthews et al. | |
| 7,826,482 B1 | 11/2010 | Minei et al. | |
| 7,839,847 B2 | 11/2010 | Nadeau et al. | |
| 7,882,169 B1 | 2/2011 | Droms et al. | |
| 7,885,276 B1 | 2/2011 | Lin | |
| 7,890,689 B2 | 2/2011 | Lam et al. | |
| 7,936,770 B1 | 5/2011 | Frattura et al. | |
| 7,937,438 B1 | 5/2011 | Miller et al. | |
| 7,948,986 B1 | 5/2011 | Ghosh et al. | |
| 7,953,865 B1 | 5/2011 | Miller et al. | |
| 7,991,859 B1 | 8/2011 | Miller et al. | |
| 7,995,483 B1 | 8/2011 | Bayar et al. | |
| 8,027,354 B1 | 9/2011 | Portolani et al. | |
| 8,031,633 B2 | 10/2011 | Bueno et al. | |
| 8,046,456 B1 | 10/2011 | Miller et al. | |
| 8,054,832 B1 | 11/2011 | Shukla et al. | |
| 8,055,789 B2 | 11/2011 | Richardson et al. | |
| 8,060,875 B1 | 11/2011 | Lambeth | |
| 8,131,852 B1 | 3/2012 | Miller et al. | |
| 8,149,737 B2 | 4/2012 | Metke et al. | |
| 8,155,028 B2 | 4/2012 | Abu-Hamdeh et al. | |
| 8,166,201 B2 | 4/2012 | Richardson et al. | |
| 8,176,094 B2 | 5/2012 | Friedman | |
| 8,190,767 B1 | 5/2012 | Maufer et al. | |
| 8,194,674 B1 | 6/2012 | Pagel et al. | |
| 8,199,750 B1 | 6/2012 | Schultz et al. | |
| 8,223,668 B2 | 7/2012 | Allan et al. | |
| 8,224,931 B1 | 7/2012 | Brandwine et al. | |
| 8,224,971 B1 | 7/2012 | Miller et al. | |
| 8,239,549 B2 | 8/2012 | Aura et al. | |
| 8,239,572 B1 | 8/2012 | Brandwine et al. | |
| 8,259,571 B1 | 9/2012 | Raphel et al. | |
| 8,265,075 B2 | 9/2012 | Pandey | |
| 8,281,067 B2 | 10/2012 | Stolowitz | |
| 8,312,129 B1 | 11/2012 | Miller et al. | |
| 8,339,959 B1 | 12/2012 | Moisand et al. | |
| 8,339,994 B2 | 12/2012 | Gnanasekaran et al. | |
| 8,345,650 B2 | 1/2013 | Foxworthy et al. | |
| 8,351,418 B2 | 1/2013 | Zhao et al. | |
| 8,370,834 B2 | 2/2013 | Edwards et al. | |
| 8,456,984 B2 | 6/2013 | Ranganathan et al. | |
| 8,478,902 B1 | 7/2013 | Holland et al. | |
| 8,504,718 B2 | 8/2013 | Wang et al. | |
| 8,565,108 B1 | 10/2013 | Marshall et al. | |
| 8,611,351 B2 | 12/2013 | Gooch et al. | |
| 8,612,627 B1 | 12/2013 | Brandwine | |
| 8,625,594 B2 | 1/2014 | Safrai et al. | |
| 8,625,603 B1 | 1/2014 | Ramakrishnan et al. | |
| 8,625,616 B2 | 1/2014 | Vobbilisetty et al. | |
| 8,627,313 B2 | 1/2014 | Edwards et al. | |
| 8,644,188 B1 | 2/2014 | Brandwine et al. | |
| 8,660,129 B1 | 2/2014 | Brendel et al. | |
| 8,705,513 B2 | 4/2014 | Merwe et al. | |
| 8,725,852 B1* | 5/2014 | Boddu ............... H04L 61/2076 709/224 |
| 8,958,298 B2 | 2/2015 | Zhang et al. | |
| 9,043,463 B1 | 5/2015 | Cohn et al. | |
| 9,059,999 B2 | 6/2015 | Koponen et al. | |
| 9,286,047 B1 | 3/2016 | Avramov et al. | |
| 9,300,581 B1* | 3/2016 | Hui ............... H04L 45/04 |
| 9,887,960 B2 | 2/2018 | Chanda et al. | |
| 9,952,885 B2 | 4/2018 | Chanda et al. | |
| 9,999,030 B2 | 6/2018 | Gu et al. | |
| 10,484,515 B2 | 11/2019 | Masurekar et al. | |
| 10,764,238 B2 | 9/2020 | Chanda et al. | |
| 10,862,791 B1* | 12/2020 | Morris ............... H04L 45/16 |
| 2001/0043614 A1 | 11/2001 | Viswanadham et al. | |
| 2002/0029287 A1* | 3/2002 | Yemini ............... H04L 45/62 709/238 |
| 2002/0093952 A1 | 7/2002 | Gonda | |
| 2002/0194369 A1 | 12/2002 | Rawlins et al. | |
| 2003/0041170 A1 | 2/2003 | Suzuki | |
| 2003/0058850 A1 | 3/2003 | Rangarajan et al. | |
| 2003/0069972 A1 | 4/2003 | Yoshimura et al. | |
| 2003/0093481 A1 | 5/2003 | Mitchell et al. | |
| 2003/0163341 A1 | 8/2003 | Banerjee | |
| 2004/0021678 A1 | 2/2004 | Ullah et al. | |
| 2004/0073659 A1 | 4/2004 | Rajsic et al. | |
| 2004/0078419 A1 | 4/2004 | Ferrari et al. | |
| 2004/0098505 A1 | 5/2004 | Clemmensen | |
| 2004/0267866 A1 | 12/2004 | Carollo et al. | |
| 2005/0018669 A1 | 1/2005 | Arndt et al. | |

(56) References Cited

U.S. PATENT DOCUMENTS

| | | |
|---|---|---|
| 2005/0027881 A1 | 2/2005 | Figueira et al. |
| 2005/0041596 A1* | 2/2005 | Yokomitsu .......... H04L 61/6063 370/252 |
| 2005/0053079 A1 | 3/2005 | Havala |
| 2005/0080891 A1 | 4/2005 | Cauthron |
| 2005/0083953 A1 | 4/2005 | May |
| 2005/0120160 A1 | 6/2005 | Plouffe et al. |
| 2005/0132044 A1 | 6/2005 | Guingo et al. |
| 2005/0188063 A1 | 8/2005 | Finley et al. |
| 2005/0251856 A1 | 11/2005 | Araujo et al. |
| 2005/0264420 A1* | 12/2005 | Vogel .............. H04L 29/12216 340/572.1 |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0161663 A1 | 7/2006 | Palm |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291388 A1 | 12/2006 | Amdahl et al. |
| 2007/0043860 A1 | 2/2007 | Pabari |
| 2007/0061492 A1 | 3/2007 | Riel |
| 2007/0064673 A1 | 3/2007 | Bhandaru et al. |
| 2007/0140128 A1 | 6/2007 | Klinker et al. |
| 2007/0156919 A1 | 7/2007 | Potti et al. |
| 2007/0201357 A1 | 8/2007 | Smethurst et al. |
| 2007/0286209 A1 | 12/2007 | Wang et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0072305 A1 | 3/2008 | Casado et al. |
| 2008/0086726 A1 | 4/2008 | Griffith et al. |
| 2008/0151893 A1 | 6/2008 | Nordmark et al. |
| 2008/0159301 A1 | 7/2008 | Heer |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2009/0019536 A1 | 1/2009 | Green et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0129271 A1 | 5/2009 | Ramankutty et al. |
| 2009/0132696 A1 | 5/2009 | Cankaya et al. |
| 2009/0150527 A1 | 6/2009 | Tripathi et al. |
| 2009/0161547 A1 | 6/2009 | Riddle et al. |
| 2009/0177953 A1 | 7/2009 | Cau |
| 2009/0193103 A1* | 7/2009 | Small ................ H04L 61/2084 709/221 |
| 2009/0235325 A1 | 9/2009 | Dimitrakos et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0282471 A1 | 11/2009 | Green et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2009/0327471 A1 | 12/2009 | Astete et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0275199 A1 | 10/2010 | Smith et al. |
| 2010/0290485 A1 | 11/2010 | Martini et al. |
| 2010/0299419 A1 | 11/2010 | Ramankutty et al. |
| 2010/0318609 A1 | 12/2010 | Lahiri et al. |
| 2010/0322255 A1 | 12/2010 | Hao et al. |
| 2011/0016215 A1 | 1/2011 | Wang |
| 2011/0022694 A1 | 1/2011 | Dalal et al. |
| 2011/0022695 A1 | 1/2011 | Dalal et al. |
| 2011/0026537 A1 | 2/2011 | Kolhi et al. |
| 2011/0030032 A1* | 2/2011 | Baykal ................ H04L 61/2015 726/3 |
| 2011/0032830 A1 | 2/2011 | Merwe et al. |
| 2011/0075664 A1 | 3/2011 | Lambeth et al. |
| 2011/0075674 A1 | 3/2011 | Li et al. |
| 2011/0082879 A1 | 4/2011 | Hazlewood et al. |
| 2011/0085557 A1 | 4/2011 | Gnanasekaran et al. |
| 2011/0085559 A1 | 4/2011 | Chung et al. |
| 2011/0119382 A1 | 5/2011 | Shaw, Jr. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0194567 A1 | 8/2011 | Shen |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0307548 A1* | 12/2011 | Fisk ..................... H04L 65/604 709/203 |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0027008 A1 | 2/2012 | Chou |
| 2012/0131643 A1 | 5/2012 | Cheriton |
| 2012/0131662 A1 | 5/2012 | Kuik |
| 2012/0182992 A1 | 7/2012 | Cowart et al. |
| 2012/0197973 A1 | 8/2012 | Tukol et al. |
| 2012/0236734 A1 | 9/2012 | Sampath et al. |
| 2012/0246282 A1 | 9/2012 | Oguchi |
| 2012/0281711 A1 | 11/2012 | Karaoguz et al. |
| 2013/0007740 A1 | 1/2013 | Kikuchi et al. |
| 2013/0041987 A1 | 2/2013 | Warno |
| 2013/0044636 A1* | 2/2013 | Koponen ................ H04L 47/12 370/254 |
| 2013/0044641 A1 | 2/2013 | Koponen et al. |
| 2013/0054773 A1 | 2/2013 | Onque |
| 2013/0058229 A1 | 3/2013 | Casado et al. |
| 2013/0058346 A1 | 3/2013 | Sridharan et al. |
| 2013/0058351 A1 | 3/2013 | Casado et al. |
| 2013/0073743 A1 | 3/2013 | Ramasamy et al. |
| 2013/0103836 A1* | 4/2013 | Baniqued ............ H04L 61/2015 709/226 |
| 2013/0125124 A1* | 5/2013 | Kempf .................. H04L 41/042 718/1 |
| 2013/0128891 A1 | 5/2013 | Koponen et al. |
| 2013/0142048 A1 | 6/2013 | Gross, IV et al. |
| 2013/0148505 A1 | 6/2013 | Koponen et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0166707 A1 | 6/2013 | Christenson et al. |
| 2013/0166754 A1 | 6/2013 | Christenson et al. |
| 2013/0182712 A1* | 7/2013 | Aguayo ................ H04L 41/12 370/395.53 |
| 2013/0227550 A1 | 8/2013 | Weinstein et al. |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0294230 A1 | 11/2013 | Popa et al. |

(56) References Cited

U.S. PATENT DOCUMENTS

| | | |
|---|---|---|
| 2013/0305320 A1* | 11/2013 | Warrick .............. G06Q 10/02 726/4 |
| 2013/0329548 A1 | 12/2013 | Nakil et al. |
| 2013/0332577 A1* | 12/2013 | Nakil .............. H04L 41/0659 709/219 |
| 2013/0332602 A1* | 12/2013 | Nakil .............. G06F 11/008 709/224 |
| 2013/0332983 A1 | 12/2013 | Koorevaar et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0047081 A1* | 2/2014 | Edwards .............. H04L 63/0272 709/220 |
| 2014/0068602 A1 | 3/2014 | Gember et al. |
| 2014/0075013 A1 | 3/2014 | Agrawal et al. |
| 2014/0089503 A1* | 3/2014 | Thyni .............. H04L 61/1511 709/224 |
| 2014/0115578 A1 | 4/2014 | Cooper et al. |
| 2014/0129700 A1* | 5/2014 | Mehta .............. G06F 11/3636 709/224 |
| 2014/0181274 A1* | 6/2014 | Bazin .............. H04L 61/2015 709/220 |
| 2014/0189081 A1* | 7/2014 | Morris .............. H04L 61/50 709/223 |
| 2014/0195666 A1 | 7/2014 | Dumitriu et al. |
| 2014/0281029 A1 | 9/2014 | Danforth |
| 2014/0313933 A1* | 10/2014 | Chen .............. H04L 12/66 370/254 |
| 2014/0325040 A1* | 10/2014 | Moore .............. H04L 41/0816 709/221 |
| 2015/0016469 A1 | 1/2015 | Ganichev et al. |
| 2015/0052262 A1* | 2/2015 | Chanda .............. H04L 61/2015 709/245 |
| 2015/0052522 A1* | 2/2015 | Chanda .............. G06F 9/455 718/1 |
| 2015/0058467 A1* | 2/2015 | Douglas .............. H04L 67/16 709/223 |
| 2015/0058968 A1* | 2/2015 | Wang .............. H04L 63/0281 726/12 |
| 2015/0095472 A1 | 4/2015 | Cardona et al. |
| 2015/0103838 A1 | 4/2015 | Zhang et al. |
| 2015/0117445 A1 | 4/2015 | Koponen et al. |
| 2015/0124644 A1* | 5/2015 | Pani .............. H04L 61/2007 370/254 |
| 2015/0124823 A1 | 5/2015 | Pani et al. |
| 2015/0163196 A1 | 6/2015 | Bhagwat et al. |
| 2015/0237002 A1* | 8/2015 | Baniqued .............. H04L 61/2015 709/220 |
| 2015/0244617 A1* | 8/2015 | Nakil .............. H04L 41/0631 709/224 |
| 2015/0263899 A1* | 9/2015 | Tubaltsev .............. H04L 45/02 370/254 |
| 2015/0281947 A1* | 10/2015 | Patil .............. H04W 72/0406 370/329 |
| 2015/0288443 A1* | 10/2015 | Foxworthy .............. H04L 12/4645 370/316 |
| 2015/0334696 A1* | 11/2015 | Gu .............. G06F 9/45558 718/1 |
| 2015/0363221 A1* | 12/2015 | Terayama .............. G06F 9/45558 718/1 |
| 2015/0381478 A1 | 12/2015 | Zhang et al. |
| 2016/0112452 A1* | 4/2016 | Guevin .............. H04L 63/10 726/1 |
| 2016/0119054 A1* | 4/2016 | Foxworthy .............. H04B 7/18513 370/319 |
| 2016/0156718 A1* | 6/2016 | Allan .............. H04L 67/10 709/228 |
| 2016/0248729 A1 | 8/2016 | Cui et al. |
| 2016/0352867 A1 | 12/2016 | Subbarayan et al. |
| 2017/0034012 A1* | 2/2017 | Douglas .............. H04L 41/5077 |
| 2017/0317969 A1 | 11/2017 | Masurekar et al. |
| 2017/0317974 A1 | 11/2017 | Masurekar et al. |
| 2018/0159821 A1 | 6/2018 | Chanda et al. |
| 2020/0366640 A1 | 11/2020 | Chanda et al. |

FOREIGN PATENT DOCUMENTS

| | | |
|---|---|---|
| EP | 1653688 A1 | 5/2006 |
| JP | 2003069609 A | 3/2003 |
| JP | 2003124976 A | 4/2003 |
| JP | 2003318949 A | 11/2003 |
| JP | 2010226665 A | 10/2010 |
| WO | 2005112390 A1 | 11/2005 |
| WO | 2008095010 A1 | 8/2008 |

OTHER PUBLICATIONS

Cain, Nigel, "System Center: Virtual Machine Manager Engineering Blog. Networking in VMM 2012 SP1-Logical Networks (Part I)," Feb. 14, 2013, 24 pages, Retrieved from: https://blogs.technet.microsoft.com/scvmm/2013/02/14/networking-in-vmm-2012-sp1-logical-networks-part-i/.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., (U.S. Appl. No. 61/514,990), filed Aug. 4, 2011, 31 pages.

Greenberg, Albert, et al., "VL2: A Scalable and Flexible Data Center Network," SIGCOMM '09, Aug. 17-21, 2009, 12 pages, ACM, Barcelona, Spain.

Guichard, J., et al., "Network Service Chaining Problem Statement," Network Working Group, Jun. 13, 2013, 14 pages, Cisco Systems, Inc.

Kim, Changhoon, et al., "Floodless in Seattle: A Scalable Ethernet Architecture for Large Enterprises," SIGCOMM'08, Aug. 17-22, 2008, 12 pages, ACM, Seattle, Washington, USA.

Non-Published Commonly Owned U.S. Appl. No. 16/945,541, filed Jul. 31, 2020, 73 pages, Nicira, Inc.

* cited by examiner

IMPLEMENTING LOGICAL DHCP SERVERS IN LOGICAL NETWORKS

CLAIM OF BENEFIT TO PRIOR APPLICATIONS

This application is a continuation application of U.S. patent application Ser. No. 15/420,070, filed Jan. 30, 2017, now published as U.S. Patent Publication 2017/0317969. U.S. patent application Ser. No. 15/420,070 claims the benefit of U.S. Provisional Patent Application 62/329,958, filed Apr. 29, 2016. U.S. patent application Ser. No. 15/420,070, now published as U.S. Patent Publication 2017/0317969, is incorporated herein by reference.

BACKGROUND

Typical physical networks often use dynamic host configuration protocol (DHCP) to assign IP addresses to physical machines. When a computer boots up in a network, it communicates with one or more DHCP servers to request and receive an IP address. In virtualized (logical) networks, virtual machines (VMs) also require IP addresses. In a multi-tenant data center, each tenant's network topology may include several different subnets with different IP address ranges assigned to the subnets. As such, two or more subnets (belonging to different tenants) may share the same or overlapping IP address ranges. Typically, in order to provide DHCP services for different logical networks that have subnets with overlapping IP address ranges, a network has to deploy multiple DHCP servers that are isolated from each other. As such, a large network that implements thousands of logical networks would require thousands of isolated DHCP servers.

BRIEF SUMMARY

Some embodiments provide a method for providing dynamic host configuration protocol (DHCP) services to different data compute nodes (e.g., virtual machines) that belong to different logical networks (e.g., for different tenants in a datacenter). In some embodiments, the method inserts a logical network's identification data to the DHCP packet and forwards the packet to a DHCP server module for processing the DHCP request. The logical network's identification data may include a logical network identifier (LNI), a logical switch identifier (LSI), or a combination of both. Based on the inserted data, the DHCP server of some embodiments identifies the logical network from which the DHCP packet is received. The DHCP server then provides the requested DHCP service (e.g., assigning an IP address to a data compute node that has originated the DHCP packet, assigning a domain name, etc.) according to a DHCP service configuration for the identified logical network. As such, a DHCP server can assign IP addresses to data compute nodes that are on different subnets of logical networks even when these subnets have overlapping IP address ranges.

In some embodiments, a managed forwarding element (MFE) in a set of MFEs that implements the different logical networks (i.e., different logical forwarding elements of the logical networks) on a physical node inserts the logical network ID to the DHCP packets that are received from different data compute nodes of different logical networks. The managed forwarding element inserts the logical network ID to a particular sub-option field (e.g., Circuit ID sub-option, Remote ID sub-option, etc.) of a particular DHCP option (e.g., DHCP option 82) of a DHCP packet in some embodiments. The particular DHCP option, in some embodiments, is part of a payload of a DHCP packet (e.g., a DHCP server discovery packet, a DHCP request packet, etc.).

Some embodiments insert a unique LSI value in a particular sub-option field of the DHCP packet. This way, the DHCP server module can identify the particular logical switch that has requested the service. Some embodiments add a universally unique identifier (UUID) that is associated with only one logical switch of a logical network to the DHCP packet. Yet, some other embodiments insert an LNI in one sub-option field (e.g., Circuit ID sub-option) and an LSI in another sub-option field (e.g., Remote ID sub-option) of the DHCP packet. The DHCP server module then matches the inserted data in the packet against a local table in order to identify a particular DHCP database (or a particular table in a DHCP database) that contains the DHCP configuration data for that particular logical switch or logical network.

The MFE that adds the network identification information to the DHCP packets often executes on an edge node of a physical network infrastructure (e.g., a datacenter) on which the logical networks are implemented. The MFE, in some embodiments, functions as a virtual tunnel endpoint (VTEP) which exchanges network data with other MFEs that execute on other host machines and/or edge nodes (e.g., one particular port of each MFE that has a unique IP address functions as a VTEP). In some embodiments, the edge node (e.g., a gateway machine) is one of several edge nodes of an edge cluster that handles north-south traffic for a logical network (e.g., connects the logical network to other logical networks implemented by the same physical network, or to other (logical and/or physical) external networks).

Some embodiments implement the DHCP server module on the same edge node on which the MFE executes. In some embodiments, the physical DHCP server module is implemented on the same edge node where the service routing component of a logical router is implemented. In some embodiments the DHCP module is part of a service routing component (module) of a logical router that provides DHCP services along with other forwarding services (e.g., network address translation, stateful firewall, load balancing, etc.). In some other embodiments, the DHCP module executes on a separate physical computing machine (e.g., on a host machine of a hosting system instead of the edge node) that is dedicated to providing DHCP services.

A user (e.g., a tenant of a hosting system) specifies a logical network topology by defining different logical elements of the logical network (e.g., switches, routers, DHCP servers, etc.) for a management plane (e.g., a manager computer of a management cluster) of the network. The user defines the logical network elements through a set of application programming interface (API) calls. The management plane, based on the received logical network definition, generates the necessary configuration data for the logical elements and pushes this configuration data to one or more controllers in a central control plane (CCP) cluster of the network. Based on the generated configuration data, the control plane configures the logical elements on a set of physical nodes (e.g., host machines, gateway machines, etc.) that implements the logical network.

One of the logical elements that a user may define for the logical network topology is a logical DHCP server that provides DHCP services for a set of data compute nodes connected to a logical forwarding element (e.g., a logical switch). In some embodiments, when the user defines a logical DHCP server for a logical switch, the management plane automatically generates a logical DHCP port on the logical switch for the logical DHCP server. The management plane then assigns unique MAC and IP addresses to the logical port in order to couple the logical port to a physical (e.g., software) DHCP server module that executes on an edge node (or to an interface of a service router that implements the DHCP module). In some embodiments, each set of defined logical DHCP servers gets mapped to a physical DHCP server operating in an edge node of an edge cluster in order to enable scalability.

In some embodiments, before a user defines a logical DHCP server, the user creates a DHCP profile. The defined DHCP profile captures DHCP configurations that can be shared by multiple logical DHCP servers, such as a default gateway for a subnet, the specification of edge cluster (e.g., the active and standby edge nodes' identification), commonly used DHCP parameters (e.g., domain name, lease period, etc.), static bindings, and IP pools. This way, each time the user defines a new logical DHCP server, the user specifies the DHCP profile from which the logical DHCP server inherits its attributes. After binding the logical DHCP server to a logical switch, the DHCP services of the logical DHCP server (some of which are specified in the DHCP profile) will be available to the logical switch (i.e., to the DCNs that are logically coupled to the logical switch).

Since a DHCP packet is a broadcast packet, when a data compute node (e.g., a virtual machine, a container, a namespace, etc.) sends out a DHCP request packet for example to request an IP address, the logical switch to which the DCN is coupled, forwards the packet to all destinations on the logical switch. As will be described in more detail below, the real forwarding operation for the logical switch is performed by an MFE that (1) executes on the same host machine as the DCN, and (2) implements a logical port of the logical switch to which the DCN is logically coupled. One of the logical switch ports that receives the broadcast DHCP packet is the logical DHCP port, the MAC address of which is associated with the DHCP server module's interface. As such, the DHCP packet is forwarded to the DHCP server module to receive the IP address.

In some embodiments, a logical router may act as a relay agent for a logical switch that is not bound to a logical DHCP server. That is, a logical router may provide the DHCP services of a logical DHCP server that is connected to a first logical switch, to a set of data compute nodes that are coupled to a second logical switch (e.g., when the second logical switch is not bound to any logical DHCP server). An edge MFE that implements such a logical router does not have to convert a broadcast DHCP packet to a unicast packet before sending the packet to the DHCP server module (in the same way that a relay agent in a physical network does). When a logical router acts as a relay agent between two logical switches of the same logical network, some embodiments require the two logical switches to be on two different subnets of the logical network (i.e., two subnets that do not have overlapping IP address ranges).

The management plane (a manager of the management plane cluster) of some embodiments selects two edge nodes from the edge cluster (or two host machines from the physical nodes of the network) to implement the DHCP server module. In some such embodiments, the first edge node implements a master (or active) DHCP server and the second edge node implements a backup (or standby) DHCP server. Thus, a particular one of the DHCP server modules is an active DHCP server that implements a particular set of logical DHCP servers, while the other DHCP server module is a standby DHCP server that implements the same particular set of logical DHCP servers in case a failover process is activated. When the logical DHCP server is implemented on two different DHCP server modules (that operate on two different edge nodes) with active-standby implementation, the managed forwarding element at the DCN's host machine sends the DHCP packet to only the active implementation (e.g., via a tunnel between the host and the edge node) in some embodiments.

In some embodiments a user (e.g., a datacenter network administrator) specifies, through the management plane, which edge nodes of the edge cluster should implement a pair of DHCP server modules (i.e., the active and standby modules). In some embodiments, if a user does not assign the edge nodes as active and standby edge nodes, the management plane of the network automatically creates the DHCP module on a pair of available edge nodes in the edge cluster. In some embodiments the management plane automatically assigns the edge nodes upon receiving a definition of a new logical DHCP server that has to be implemented by a DHCP server module. In some other embodiments, the management plane assigns the edge nodes each time the edge cluster starts up.

A user may query the management plane for the status of a logical DHCP server in a logical network or the status of a physical DHCP server module that implements one or more logical DHCP servers. The queried status may include the IP pools' status, the lease information, etc., of one or more logical DHCP servers implemented by the DHCP server module. In some embodiments, the DHCP related states of the logical DHCP servers are reported to the user (through the management plane) upon occurrence of a particular event. For example, in some embodiments, the DHCP states of the logical DHCP servers are reported to one or more users each time a new logical router is added to a logical network. In some other embodiments the status is reported each time an edge node that implements a DHCP server module fails. Some other embodiments generate status reports periodically.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method for providing dynamic host configuration protocol (DHCP) services to different data compute nodes (e.g., virtual machines) that belong to different logical networks (e.g., for different tenants in a datacenter). In some embodiments, the method inserts a logical network identifier (LNI) to the DHCP packet and forwards the packet to a DHCP server module for processing the DHCP request. Based on the LNI value, the DHCP server of some embodiments identifies the logical network from which the DHCP packet is received. The DHCP server then provides the requested DHCP service (e.g., assigning an IP address to a data compute node that has originated the DHCP packet, assigning a domain name, etc.) according to a DHCP service configuration for the identified logical network.

Figure 1:
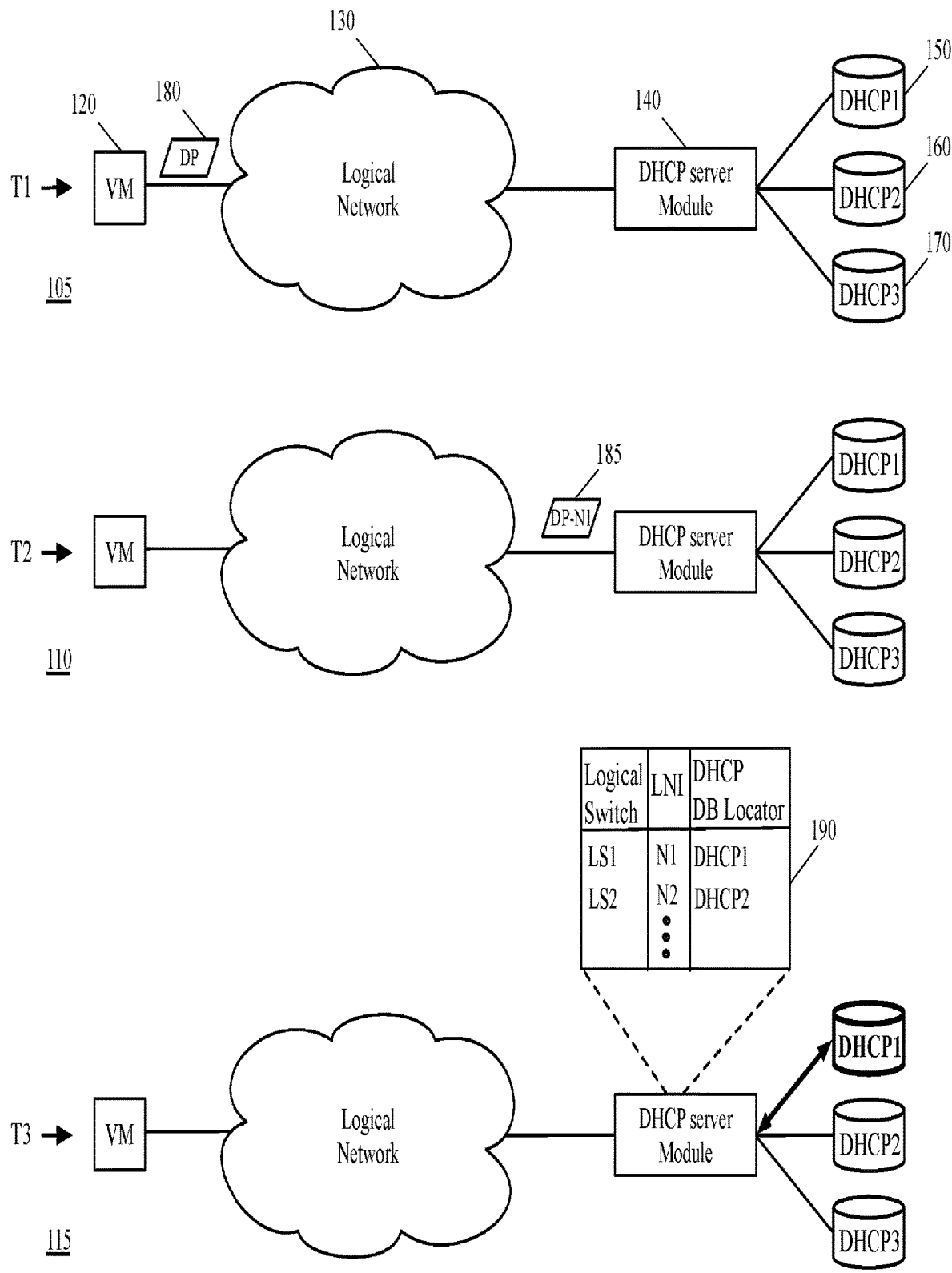
FIG. 1 illustrates an example of inserting a logical network identifier (LNI) to a DHCP packet that is initiated by a data compute node to receive a DHCP service from a DHCP server.

FIG. 1 illustrates an example of inserting a logical network identifier to a DHCP packet that is initiated by a data compute node to receive a DHCP service from a DHCP server. More specifically, FIG. 1 illustrates, in three different stages 105-115, which represent three different points of time T1-T3, how an LNI is added to a DHCP packet request (e.g., for an IP address) that is originated by a virtual machine (VM) logically connected to a particular logical network. The request is for providing a DHCP service that is configured for the particular logical network. The figure includes a VM 120, a logical network 130, a DHCP server module 140, and three different database storages 150-170.

In some embodiments, the VM 120 is a virtual machine that executes on a host machine (e.g., of a hosting system such as a datacenter). The VM is logically coupled to a logical network 130 that connects the VM to other VMs of a tenant of the hosting system. The other VMs may execute on the same host machine as the VM, or other host machines of the hosting system. The logical network also connects the VMs of the tenant to other logical networks that are implemented on the physical nodes of the hosting system, or other physical and/or logical networks outside the hosting system (i.e., external networks).

The DHCP server module 140 is a physical (software) module that operates on an edge node or a host machine of the hosting system in some embodiments. The DHCP server module of some embodiments is part of a service router of a logical router that operates on an edge node and provides different types of services such as stateful firewall and NAT services to to one or more logical networks of one or more tenants. In some other embodiments, the DHCP module is an independent module that provides DHCP services to the logical networks.

Each of the database storages 150-170 includes DHCP related data for a particular logical network. This data is received from a user (e.g., tenant) as part of the DHCP configuration data for the logical network and can be updated at runtime. In some embodiments, before the user defines a logical DHCP server that provides DHCP services, the user should create a DHCP profile. The DHCP profile captures DHCP configurations that can be shared by multiple logical DHCP servers, such as a default gateway, specification of the edge cluster (e.g., the active and standby edge nodes' identification), commonly used DHCP parameters (e.g., domain name, lease period, etc.), static bindings, and IP pools. This way, each time the user defines a new logical DHCP server, the user specifies the DHCP profile from which the logical DHCP server inherits its attributes. The logical DHCP server may be bound to a logical switch to make the DHCP services specified in the DHCP profile available for the logical switch.

Since a DHCP packet is a broadcast packet, when a data compute node (e.g., a virtual machine, a container, a namespace, etc.) sends out a DHCP packet (e.g., discovery packet), the logical switch to which the DCN is coupled, forwards the packet to all destinations on the logical switch. Lastly, although shown as three separate storages, the database storages 150-170 can be included in a single database storage that stores the DHCP profiles for logical DHCP servers of all of the logical networks in some embodiments.

The first stage 105 illustrates that at time T1, the VM 120 has generated and forwarded a DHCP packet 180 towards the DHCP server module 140 through the logical network 130. In some embodiments each time a DCN that is connected to a logical network starts executing on a host machine, the DCN requests for an IP address assigned to it. In order to do so, the DCN generates a broadcast DHCP discovery packet and forwards the packet to a logical switch (in the logical network) to which the DCN is coupled. The logical switch is one of the logical forwarding elements (e.g., logical switches, logical routers, etc.) in the logical network 130 that is dedicated to a tenant of the hosting system. Additionally, the logical network 130 is one of the logical networks that are implemented across the physical nodes of the hosting system.

One of the logical ports of the logical switch that receives the packet is coupled to a logical DHCP server 135, which is another logical network element in the logical network 130. As such, the broadcast DHCP packet 180 is forwarded to the logical DHCP server 135. As will be discussed in more detail below, the logical switch and DHCP server are implemented by a set of managed forwarding elements that executes on a host machine that hosts the DCN 120. The set of managed forwarding elements executes a pipeline for each of these logical elements in order to implement them.

The logical DHCP server 135 manages static IP addresses, as well as a pool of IP addresses and contains information about client configuration parameters such as default gateway, domain name, the name servers, and time servers for the DCNs that are connected to the logical switch. Upon receiving the DHCP request packet, the logical DHCP server may respond with specific information for each DCN (e.g., as previously configured by an administrator), or with a specific address and any other information valid for the entire logical network and for the time period for which the allocation of service (e.g., a lease) is valid. A DCN typically queries for this information immediately after booting (i.e., executing on the host machine), and periodically thereafter before the expiration of the information. When a DCN refreshes an assignment, it initially requests the same parameter values, but the logical DHCP server may assign a new address based on the assignment policies in the DHCP profile (e.g., that is set by a network administrator, by a tenant, etc.).

In order to have a central DCHP server provide DHCP services to more than one logical switch of one logical network, some embodiments implement a DHCP server module 140 on a physical node (e.g., an edge node, a host machine, etc.) of the hosting system. The DHCP server module 140 executes on a physical node and implements one or more logical DHCP servers, each of which is bound to a logical switch. On the other hand, the DHCP server module 140 is also connected to one or more local databases that each stores the required DHCP data for a logical network (or a logical switch of the logical network). As such, the DHCP server module 140 should be able to recognize the logical switch and network from which the DHCP request is received in order to provide corresponding DHCP services that have been defined and configured only for that logical switch and network.

The second stage 110 illustrates that at time T2, the DHCP packet 185 is sent from the logical network 130 towards the DHCP server module 140. The DHCP packet 185 is the same DHCP packet 180 which was sent out from the VM 120 at stage 105. However, at this stage, the packet 185 contains additional data that one or more managed forwarding elements that implement the logical network have added to the packet (e.g., to the payload of the packet). Some embodiments add the logical switch and/or logical network identification information to each DHCP packet in order to enable the DHCP server module 140 to identify which logical switch or network has sent the request and to provide the requested service accordingly.

In some embodiments, a set of managed forwarding elements that implements the different logical networks inserts the LNIs to the DHCP request packets that are received from different data compute nodes of different logical networks. Implementation of logical networks by managed forwarding elements is discussed in more detail below by reference to FIGS. 3 and 4. These figures show how the MFEs of different physical nodes that implement a logical network exchange the DHCP packets (as well as other network data) between each other.

The set of MFE inserts the LNI (or a logical switch identifier) to a particular sub-option field (e.g., Circuit ID sub-option, Remote ID sub-option, etc.) of a particular DHCP option (e.g., DHCP option 82) of the DHCP packet in some embodiments. The particular DHCP option, in some embodiments, is part of a payload of the DHCP packet (e.g., payload of a DHCP discovery packet or a DHCP request). Although in the illustrated example, the set of MFEs inserts a logical network identifier to the DHCP packet ("N1" is added to "DP" in the example), the MFEs of different embodiments add other types of identifiers to the DHCP packet before sending the packet to a DHCP server module.

For example, some embodiments insert a unique logical forwarding element identifier (e.g., an identifier value for a logical switch) in a particular sub-option field of the DHCP packet. This way, the DHCP identifier can identify the particular logical forwarding element that has requested the service. For example, if a user assign one logical DHCP server to a first logical switch of a logical network and a different logical DHCP server to a second logical switch of the same logical network, the DHCP server module will be able to distinguish between the services for each logical switch even though they both belong to the same network. Some embodiments add a universally unique identifier (UUID) that is associated with only one logical forwarding element and network to the DHCP packet. Yet, some other embodiments insert an LNI in one sub-option field and a logical forwarding element identifier in another sub-option field of the DHCP packet.

The third stage 115 shows that the DHCP server module 140, after receiving the packet 185, matches the inserted data in the packet 185 against a local table 190 to identify the DHCP services that are configured for the logical network 130 and provide the required service. In some embodiments, the DHCP server module 140 reads the identification value (e.g., in the circuit ID sub-option field of the packet) and compares this value against the local table 190. The module then maps the network ID (or switch ID) stored in the packet to the corresponding DHCP database locator. This way, the module realizes which database contains the required DHCP configuration data for the logical network from which the request packet is received. For instance, in the illustrated example, since the circuit ID value of the DHCP packet is "N1" the DHCP server module realizes that the the packet is received from the logical network N1. As such, the DHCP server module looks up the requested DHCP service in the related database DHCP1 which is specified in the table 190.

As illustrated in this stage, after identifying that the DHCP data (e.g., an IP pool) for the identified logical network is stored in the first DHCP configuration database 150 (as highlighted in the figure), the DHCP server module 140 starts retrieving the required data from this database in order to provide the requested service. For example, if the requested service is assignment of a new IP address, the DHCP server module retrieves a new IP address from the IP pool stored in the database and sends the IP address to the DCN 120 (e.g., through a DHCP IP lease offer packet).

In some embodiments, the management plane (e.g., a manager machine, a manager application, etc.) receives the logical network topology (definition) from a user (e.g., a tenant in a datacenter). The user provides the logical network definition (e.g., logical network topology) to the management plane through a set of application programming interface (API) calls in some embodiments. The management plane, based on the received logical network definition, generates the necessary configuration data for the logical forwarding elements (e.g., logical switches, logical routers, logical DHCP servers, etc.) and pushes this configuration data to a control plane (one or more controllers of a central control plane (CCP) cluster) of the network. The management and control planes configure the logical network elements on a set of physical nodes (e.g., host machines, gateway machines, etc.) that implements the logical network.

The control plane, in some embodiments, modifies the configuration of the logical forwarding elements (LFEs) on the physical nodes that implement the LFEs at runtime. That is, based on the generated configuration data that the control plane receives from the management plane and the runtime data that the control plane receives from the physical nodes, the control plane modifies the configuration of the LFEs on the physical nodes at runtime. In some embodiments, as will be described in more detail below, the management and control planes configure the LFEs on a physical node by configuring a managed forwarding element (MFE) that executes on the physical node (e.g., in the virtualization software of the physical node) to implement the LFEs of the logical network.

A logical network topology, in some embodiments, includes a set of logical network entities that are placed on different logical paths of the network. Examples of logical network entities in a logical network include logical forwarding elements (e.g., logical L2 and L3 switches, logical routers), logical middleboxes (e.g., logical firewalls, logical load balancers, etc.), logical DHCP servers, and other logical network elements such as a source or destination data compute node (DCN) and a tunnel endpoint (e.g., implemented by an MFE). While a DCN or tunnel endpoint typically operates on a single host machine, a logical forwarding element or logical middlebox spans several different MFEs (e.g., software and/or hardware MFEs) that operate on different machines (e.g., a host machine, a top of rack hardware switch, etc.).

The logical forwarding elements of a logical network logically connect several different DCNs (e.g., VMs, containers, physical machines, etc.) that run on different host machines, to each other and to other logical and/or physical networks. In some embodiments, different subsets of DCNs reside on different host machines that also execute the MFEs. Each set of MFEs, as stated above, executes on a physical node (e.g., a host machine) and implements the LFEs of the logical network to which a subset of DCNs that runs on the host machine is logically connected.

One of the logical elements that a user may define for the logical network topology is a logical DHCP server that provides DHCP services for a set of data compute nodes connected to a logical forwarding element (e.g., a logical switch). In some embodiments, when the user defines a logical DHCP server for a logical switch, the management plane automatically generates a logical DHCP port on the logical switch for the logical DHCP server. The management plane then assigns a unique MAC address to the logical port in order to couple the logical port to a physical DHCP server module executing on an edge node (e.g., a DHCP module in a service router that executes on the edge node).

In some embodiments, each set of defined logical DHCP servers gets mapped to a physical DHCP server operating in an edge node of an edge cluster in order to enable scalability. That is, for example, different logical DHCP servers of a first set of logical networks may be mapped to a first DHCP server module that executes on a first edge node (in a first edge cluster), while the logical DHCP servers of a second set of logical networks are mapped to a second DHCP server module that executes on a second edge node (e.g., in the same first edge cluster or a different, second edge cluster).

An MFE, in some embodiments, is an application and/or process that executes in a virtualization software (e.g., a hypervisor) of a physical node that implements one or more logical network elements of one or more logical networks. For example, implementing the LFEs of a logical network on a host machine includes performing network traffic forwarding processing for the packets that are originated from and/or destined for a set of DCNs that resides on the host machine on which the MFE operates. Additionally, as a particular host machine may host DCNs of more than one logical networks (e.g., belonging to different tenants), the MFEs running on the host machine may implement different sets of LFEs that belong to different logical networks.

As described above, a set of MFEs (e.g., a particular MFE in the set) that executes on a particular machine on which a DHCP server module also executes, inserts the network identification information to the DHCP packets received from other sets MFEs. In some embodiments the set of MFEs executes on an edge node of a physical network infrastructure (e.g., a datacenter) over which the logical networks are implemented. An MFE in the set implements a virtual tunnel endpoint (VTEP) which exchanges network data with other MFEs that execute on other host machines and/or edge nodes. In some embodiments, the edge node (e.g., a gateway machine) is one of several edge nodes of an edge cluster that connects a logical network to other logical networks and/or to external networks (e.g., external logical and/or physical networks).

In some embodiments, the physical DHCP server module is implemented on the same edge node where the service routing component of a logical router is implemented. A logical router and its different components are described in more detail below by reference to FIG. 8. In some embodiments the DHCP module is a part of the service routing component (module), which provides DHCP services along with other forwarding services (e.g., network address translation, stateful firewall, load balancing, etc.). In some other embodiments the DHCP module executes on a separate physical computing machine (e.g., on a host machine) that is dedicated to DHCP service providing.

Figure 2:
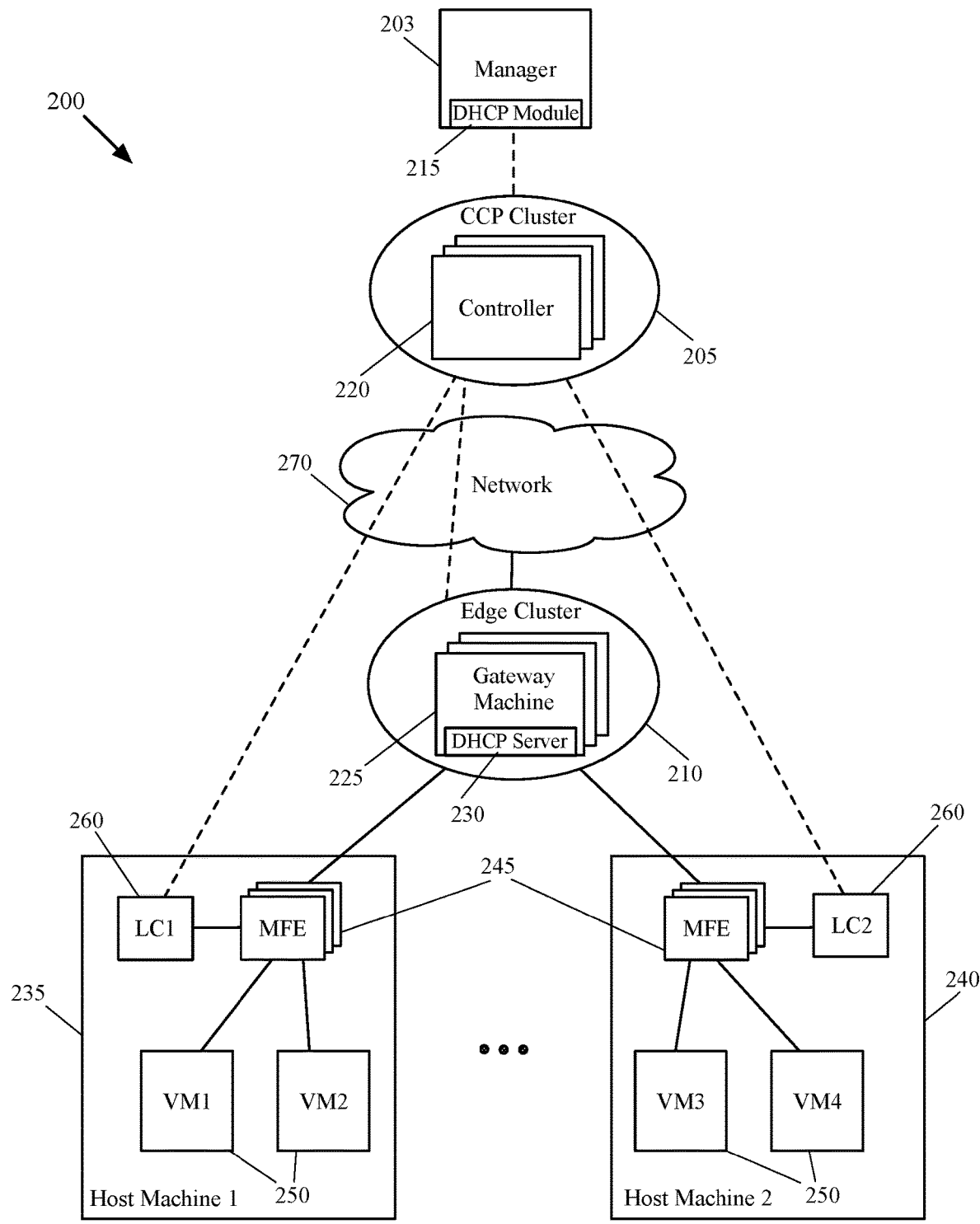
FIG. 2 conceptually illustrates a physical network topology that connects one or more logical networks implemented on the physical nodes of the network to one or more external networks.

FIG. 2 conceptually illustrates a physical network topology 200 that connects one or more logical networks implemented on the physical nodes of the network to one or more external networks. More specifically, this figure shows different physical nodes such as host machines, gateway machines, managers, and controllers of a physical network (e.g., a datacenter) that implement logical network entities of different logical networks. FIG. 2 includes a manager 203, a controller cluster 205, an edge cluster 210, an external network 270, and two host machines 235 and 240. Each of the host machines shown in the figure includes a set of managed forwarding elements 245, a local controller 260, and a set of data compute nodes 250 (VM1-VM4).

In some embodiments, the MFEs 245, as described above, are implemented in the virtualization software (e.g., hypervisor) of the host machines 235 and 240 (the hypervisors are not shown in the figure for simplicity of description). The controller cluster 205 includes a set of controllers 220 that control the data exchange between the logical forwarding elements. The edge cluster 210 includes a set of edge nodes (e.g., gateway machines) 225 that connect one or more logical networks implemented on the physical nodes to the external network 270.

For example, a logical network, which logically connects the VMs executing on the host machine 235 to the VMs that execute on the host machine 240, can be connected to the external network 270 through one or more gateway machines 225 of the edge cluster 210. The external network 270 may then connect the VMs 250 running on the host machines to other logical networks that are implemented on other host machines (in the same hosting system). The external network 270 may also connect the VMs to other physical and/or logical networks (e.g., external physical networks or logical networks that are not implemented by the hosting system).

The logical network (e.g., a set of logical switches, logical routers, logical DHCP servers, logical load balancers, etc.) is configured and managed by the manager 203 and CCP cluster 205. The logical network (i.e., the different forwarding elements of the logical network) is implemented by the MFEs 245 that run on the host machines and other MFEs (not shown in this figure) that run on the edge nodes of the edge cluster 270. The dashed lines that connect the management and control plane to the edge cluster and host machines represent the management and control plane data exchange while the solid lines represent the data plane network data exchange between the host machines and edge cluster.

The manager 203 can be a manager of a management cluster that includes several other managers each of which manages one or more logical networks in some embodiments. Each of the managers and controllers can be a physical computing device (e.g., a server, a computer, etc.), a data compute node (DCN) such as a virtual machine (VM), a container, etc., or a software instance (or a process) operating on a physical computing device or DCN. In some embodiments, a manager includes different user interface applications for administration, configuration, monitoring, and troubleshooting one or more logical networks in the physical network infrastructure (e.g., a hosting system network). These applications, in some embodiments, include a particular DHCP module 215 through which a user can define different DHCP profiles, logical DHCP servers, etc., and assign different logical DHCP servers to different logical switches.

As described above, the CCP cluster (e.g., one or more controllers 220 in the cluster) controls the network data communication between the different DCNs of a logical network (e.g., between the VMs 250 in the illustrated example) by controlling the data communications between the MFEs 245. The CCP cluster communicates with the MFEs 245 in order to control the data exchange between the MFEs since the MFEs also implement virtual tunnel endpoints (VTEPs) that ultimately exchange the logical network data between the DCNs. In order to control the data exchange, the CCP cluster of some embodiments receives runtime data for the logical network entities (e.g., VMs 250, updated forwarding data for LFEs, etc.) from each of the MFEs. The CCP cluster 220 also receives configuration data for logical network elements from the management cluster (e.g., the manager 203) and uses this data along with the runtime data in order to control the data communications of the logical network.

Although not shown, some embodiments implement a DHCP module within the CCP cluster that is responsible for configuring the DHCP server module 230 on one or more edge nodes of the edge cluster 210. The CCP cluster module receives the DHCP configuration data (e.g., logical DHCP server definitions, DHCP profiles, etc.) from the management plane (e.g., from the DHCP module 215) and configures the DHCP server module on the edge nodes based on the defined configuration, as well as runtime updates (e.g., to logical DHCP servers) received from the MFEs. For example, when a DHCP server binding is moved from one edge node to another, the CCP cluster module removes the DHCP server module from the first edge node and adds/updates the DHCP server module on the other edge node.

A local controller 260, which also executes in a hypervisor of each host machine in some embodiments, receives logical network data from a controller 220 of the CCP cluster 205. The local controller 260 then converts and customizes the received logical network data for the local set of MFE 245 that operates on the same machine on which the local controller operates. The local controller then delivers the converted and customized data to the local set of MFEs 245 on each host machine. The set of MFEs on each host machine implements the logical network based on the forwarding data that the MFEs receive from their corresponding local controller. In some embodiments one MFE implements every logical network element (e.g., logical switches, routers, etc.), while in other embodiments each MFE in the set of MFEs implements a number of the logical network elements.

In some embodiments, the connections of the end machines to an LFE (e.g. a logical switch) are defined using logical ports of the LFE, which are mapped to the physical ports of the MFEs (e.g., a first logical port of a logical switch is mapped to a physical port of an MFE that is coupled to VM1 running on the host machine 235, and a second logical port of the logical switch is mapped to a physical port of an MFE that is connected to VM3 running on the host machine 240).

When an MFE receives a packet from a DCN (e.g., VM1) that couples to a first port of a logical switch, the MFE performs the network forwarding processing for the logical switch, to which the DCN is logically coupled. The same MFE, or another MFE in the set of MFEs, also performs the forwarding processing for any additional LFE (e.g., logical router processing if the packet is sent to an external network (e.g., external network 270), logical router processing and processing for another logical switch in the network if the packet is sent to a DCN coupled to the other logical switch, etc.).

Based on the forwarding processing, the set of MFEs can decide where to send the received packet. For example, if the set of MFEs running on the host machine 235 decides to send a packet from VM1 to VM3, which is coupled to a second port of a logical switch that is implemented by a particular MFE on host machine 240, the set of MFEs sends the packet to the particular MFE (through a tunnel that is established between the sets of MFEs running on the host machines), to be delivered to VM3.

One of ordinary skill in the art would realize that the number of the host machines, managers, controllers, edge nodes, and virtual machines illustrated in the figure are exemplary and a logical network for a tenant of a hosting system may span a multitude of host machines (and third-party hardware switches), and logically connect a large number of DCNs to each other (and to several other physical devices that are connected to the hardware switches). Additionally, while shown as VMs in this figure and other figures below, it should be understood that other types of data compute nodes (e.g., namespaces, containers, etc.) may connect to logical forwarding elements in some embodiments.

The management plane (a manager of the management plane cluster) of some embodiments selects two edge nodes from the edge cluster (or two host machines from the physical nodes of the network) to implement the DHCP server module. In some such embodiments, the first edge node implements a master (or active) DHCP server and the second edge node implements a backup (or standby) DHCP server. Thus, a particular one of the DHCP server modules is an active DHCP server that implements a particular set of logical DHCP servers, while the other DHCP server module is a standby DHCP server that implements the same particular set of logical DHCP servers. As stated above, each logical DHCP server in the set is logically connected to one or more logical switches of a logical network.

When the logical DHCP server is implemented on two different DHCP server modules (that operate on two different edge nodes), with active-standby implementation, the set of managed forwarding elements at the DCN's host machine sends the DHCP packet to only the active implementation (e.g., via a tunnel between the host and the edge node) in some embodiments. The DHCP server module receives the packet and provides the required DHCP service according to a DHCP configuration that is defined for the logical network from which the DHCP packet is originated.

In some embodiments a user (e.g., a datacenter network administrator) specifies, through the management plane, which edge nodes of the edge cluster should implement the DHCP server modules (i.e., the active and standby modules). In some embodiments, if a user does not assign an edge node, the management plane automatically creates the DHCP module on a pair of available edge nodes in the edge cluster. In some embodiments the management plane automatically generates the DHCP server modules upon receiving a definition of a new logical DHCP server that has to be implemented by a DHCP server module. In some other embodiments, the management plane generates the DHCP server modules at boot time of the edge cluster.

Figure 3:
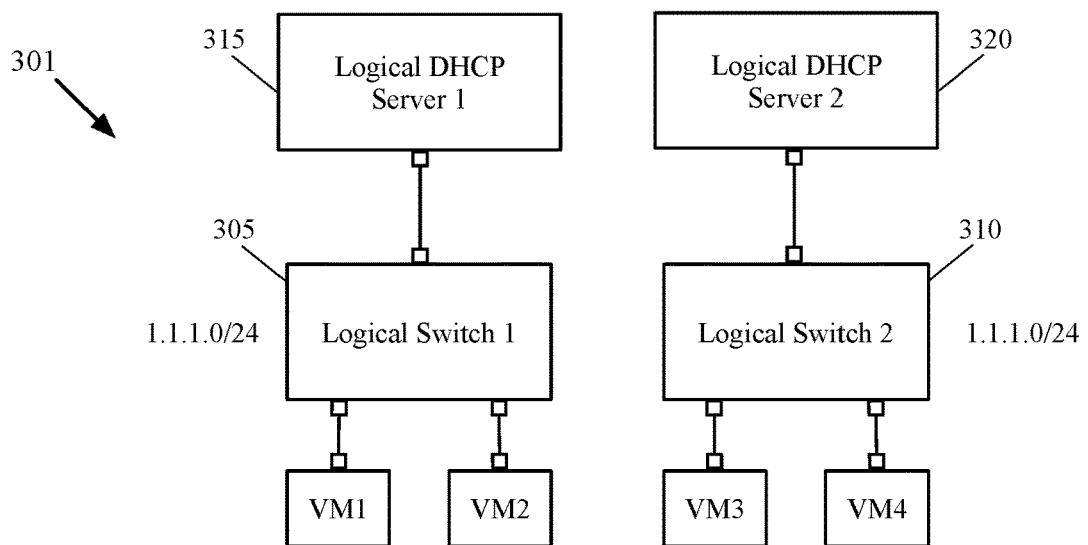
FIG. 3 illustrates implementation of different logical DHCP servers by an active DHCP server module and a standby DHCP server module executing on two different edge nodes of an edge cluster.
Figure 3:
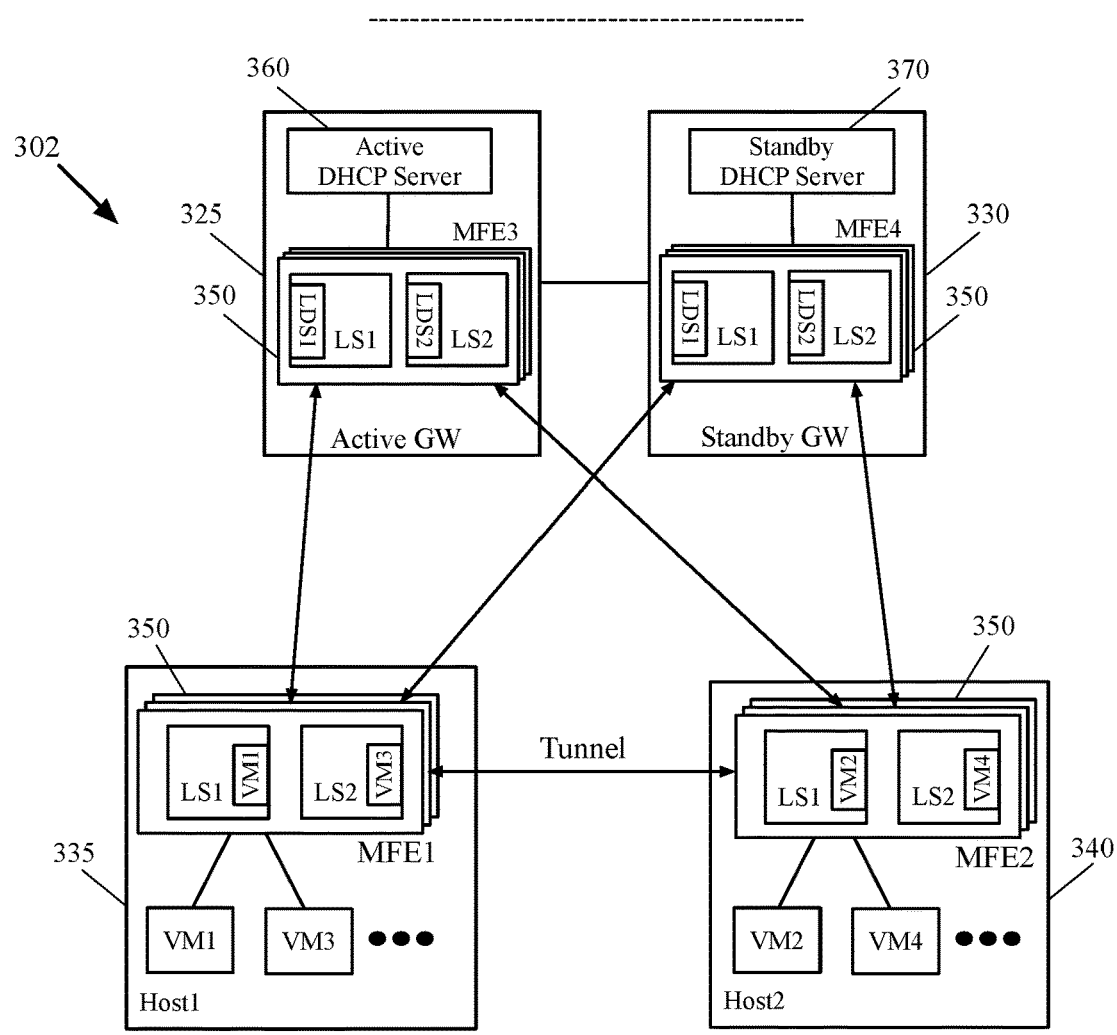

FIG. 3 illustrates implementation of different logical DHCP servers by an active DHCP server module and a standby DHCP server module executing on two different edge nodes of an edge cluster. This figure further shows how the physical nodes of the physical network implement the logical forwarding elements and logical DHCP servers of the logical network. The top half of the figure illustrates a logical network architecture 301 that includes two logical switches and two logical DHCP servers.

The two logical switches 305 and 310 logically connect four DCNs VM1-V4 to two different logical networks. The logical switch 305 is also connected to logical DHCP server 315 which provides DHCP services to DCNs VM1 and VM2, while the logical switch 310 is connected to logical DHCP server 320 which provides DHCP services to DCNs VM3 and VM4. The virtual machines VM1 and VM2 are logically connected to each other (and other machines) in a first logical network, while the virtual machines VM3 and VM4 are logically connected to each other (and other machines) in a second logical network.

Additionally, as shown in the figure, the first logical switch has a first subnet address (i.e., 1.1.1.0/24) specified by a user. For example, at the time of defining the first logical network, a first tenant has specified that any DCN that is coupled to the first logical switch has to be assigned an IP address that falls under the first subnet address range and provided by the first logical DHCP server 315. As also illustrate in the figure, the second logical switch has a same subnet address (i.e., 1.1.1.0/24) assigned to it. For example, at the time of defining the second logical network, a second tenant of the datacenter has specified that any DCN that is coupled to the second logical switch has to be assigned an IP address (by the second logical DHCP server) that falls under the second subnet address range, which is the same range as the first subnet address range.

As such, if a central DHCP server module that implements both logical DHCP servers 315 and 320 receives a request to assign an IP address to one of the VMs, the module should be able to identify from which logical switch and network the request is received and provide the IP address according to the requirements (i.e., DHCP configuration) of that logical switch and network.

The bottom half of the figure illustrates the physical network architecture 302 that implements the logical network 301. The physical nodes shown in bottom half of the figure include two gateway machines 325 and 330 as the edge nodes, and two host machines 335 and 340 which host virtual machines of different logical networks. Each of the illustrated physical nodes includes a set of MFEs 350 (e.g., operating in the virtualization software of the physical nodes in some embodiments). The host machine 335 hosts the virtual machines VM1 and VM3 along a set of other data compute nodes, while the host machine 340 hosts the virtual machines VM2 and VM4 along a set of other data compute nodes. The gateway machine 325 implements (i.e., executes) an active DHCP server module 360, while the gateway machine 330 implements a standby DHCP server module 370.

As described above, the two active and standby edge nodes 325 and 330 can be selected from the edge cluster manually (e.g., by a network administrator), or alternatively they can be selected automatically by the management plane. Having an active-standby design for DHCP server modules enables the network to implement a failover process and to provide continuity in providing DHCP services. In some embodiments, the forwarding addresses of the standby edge node 330 (e.g., the MAC/VTEP mapping of the logical switch ports) is not published to the CCP cluster by the edge node. Instead, in these embodiments, the host machines learn the IP address of the standby edge node during the failover process. That is, when a standby DHCP server module running on a standby edge node takes over the responsibilities of an active DHCP server module running on an active edge node, it sends messages to all of the host machines (i.e., the MFEs running on the host machines) that implement the corresponding logical DHCP servers to force the host machines to learn the new location of the DHCP server module (e.g., the IP address of MFE4).

When a failover process is activated and the standby edge node takes over a DHCP server module from an active edge node, the standby DHCP server module has to know about the existing leases handed out by the previously active edge node. Some embodiments periodically sync the leases (and other DHCP options and parameters) between the active and standby edge nodes. In some such embodiments, the sync process on the active edge node monitors the DHCP databases(s) (e.g., a lease table in the database) on the active edge node and sends any new changes to the standby edge node to update its corresponding databases. Since the active edge node can be a standby edge node for another active edge node in the edge cluster, the lease sync process also syncs the DHCP parameters with the other edge node. In some embodiments, the CCP cluster keeps track of the different active-standby edge nodes in the edge cluster that are assigned by the user or the management plane.

Each set of MFEs 350 implements the logical forwarding elements (LFEs) of the logical network by performing the forwarding processing of the LFEs for the packets that are received from or sent to the corresponding VMs that are connected to the MFEs. Although shown as a set of MFEs, not always two or more MFEs are involved in executing the forwarding pipelines of the logical elements. For example, based on the number of logical elements and other factors, the number of MFEs in a set of MFEs that implement the logical elements may vary. In some embodiments, each MFE in the set may implement a certain number of logical elements, a certain type of logical elements, or a combination of both. As such, in the following examples, although only one MFE is used to describe the functionality of the set of MFEs, it should be understood that more than one MFEs in each set may perform the described functionality.

In the illustrated example, a first logical port of the logical switch 305 is mapped to a physical port of MFE1 that is coupled to VM1 executing on the first host machine 335. A second logical port of the logical switch 305 is mapped to a physical port of MFE2 that is coupled to VM2 executing on the second host machine 340. Similarly, a first logical port of the logical switch 310 is mapped to another physical port of MFE1 that is coupled to VM3 executing on the first host machine 335, while a second logical port of the logical switch 310 is mapped to anther physical port of MFE2 that is coupled to VM2 executing on the second host machine 340.

A third set of MFEs that operates on the gateway machine 325 also implements the same first and second logical switches 305 and 310. However, as shown in the figure, this set of MFEs implements the logical ports of these logical switches that are connected to the logical DHCP servers 315 and 320. More specifically, a DHCP logical port of the logical switch 305 is mapped to a physical port of MFE3 that is coupled to the active DHCP server module 360. Additionally, a DHCP logical port of the logical switch 510 is also mapped to the same physical port of MFE3 that is coupled to the MDP server module 360. The fourth set of MFEs which operates on the standby edge node 330 functions the same as described for the third set of MFEs operating on the active edge node 325.

As stated above and will be described in more detail below, each of the gateway machines 325 and 330 also executes a service router (e.g., a service routing instance or application) that implements the corresponding DHCP server module shown in the figure. The MFEs are also connected to each other through the illustrated tunnels in order to exchange network data after performing the forwarding functionalities of the logical forwarding elements.

Although, in the illustrated example two end machines that are connected to the same logical switch are hosted by two different host machines (e.g., VM1 and VM2 that are connected to the same logical switch, execute on two different host machines Host1 and Host2), two or more end machines that are connected to a same logical switch may operate on the same host machine. The virtual machines VM1 and VM3 communicate (e.g., exchange network data) with each other, with the virtual machines VM2 and VM4, and with the external networks via the managed forwarding elements that implement the logical entities of the logical network 301.

As described above, the MFEs 350 operating on the host machines are physical software switches provided by the hypervisors or other virtualization software of the host machines. These MFEs perform the entire first-hop forwarding processing for the logical switches 305 and 310 on packets that are received from the virtual machines VM1-VM4 of the logical network 301. The MFEs residing on the host machines Host1 and Host2 may also implement logical switches (and distributed logical routers) for other logical networks if the other logical networks have VMs that reside on the host machines Host1 and Host2 as well.

Since each set of MFEs 350 may perform first hop processing, each set of MFEs implements all of the logical forwarding elements including the logical switches 305 and 310, as well as the logical DHCP servers 315 and 320 that are connected to these logical switches. The MFEs may be flow-based forwarding elements (e.g., Open vSwitches) or code-based forwarding elements (e.g., ESX software switches), or a combination of the two, in various different embodiments. These different types of forwarding elements implement the various logical forwarding elements differently, but in each case they execute a pipeline for each logical forwarding element that may be required to process a packet.

In some embodiments, when an MFE receives a packet from a VM that is coupled to the MFE, it performs the forwarding processing for the logical switch to which that VM logically couples. The MFE also performs the forwarding processing for any additional logical forwarding elements (e.g., logical router processing if the packet is sent to an external network, logical router processing and processing for the other logical switch in the network if the packet is sent to an end machine coupled to the other logical switch, etc.).

The management and control planes distribute the management and forwarding data of the L2 logical switches 305 and 310, and the logical DHCP servers 315 and 320 to the MFEs 350 in order for the MFEs to implement these logical forwarding elements and servers. Additionally, the management and control plane distribute the management and forwarding data of the physical DHCP server modules 315 and 320 to the gateway machines 325 and 330 to implement the logical DHCP servers (i.e., one as an active server module and the other one as a standby server module) and provide the requested DHCP services to the DCNs.

Figure 4:
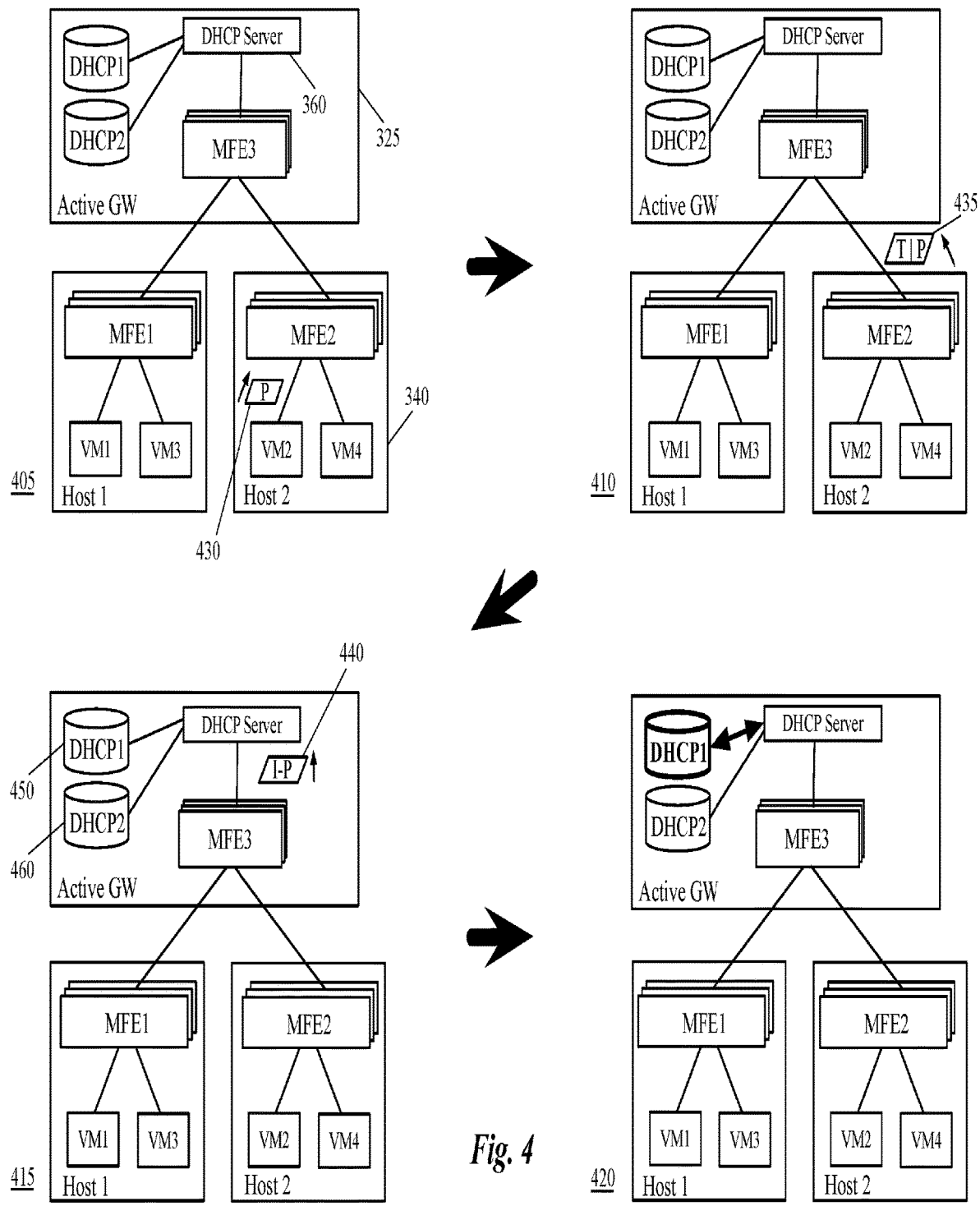
FIG. 4 illustrates an example flow of a DHCP packet that is generated and sent from a data compute node to request a particular DHCP service such as requesting an IP address after the data compute node starts.

FIG. 4 illustrates an example flow of a DHCP packet that is generated and sent from a DCN to request a particular DHCP service (e.g., request an IP address after the DCN starts). More specifically, this figure shows, through four different stages 405-420, how a packet is forwarded through the physical network elements that implement the logical network 301 shown in FIG. 3. This figure also shows how an MFE (in a set of MFEs) that executes on an edge node adds additional logical network information to the DHCP packet so that the DHCP server module can recognize which DHCP database (or which DHCP table in a single database) should be used to provide the requested DHCP service to the requesting DCN.

The first stage 305 shows that VM2, which runs on the host machine 340, has generated and forwarded a broadcast DHCP packet 430 (e.g., a discovery packet) to the managed forwarding element MFE2 that also operates on the host machine 340. The packet is being forwarded to MFE2 because this managed forwarding element implements the logical port of the logical switch to which VM2 is logically connected (as shown in the logical network 301 of FIG. 3). Since packet 430 is a broadcast packet and one of the logical ports of the logical switch 305 is connected to the logical DHCP server 315, the MFE starts processing the pipeline of logical DHCP server 315.

That is, when VM2 sends the DHCP packet 430, the datapath on MFE2 initially runs the logical switch 305 pipeline (e.g., based on the ingress port through which the packet is received, the source MAC address, etc.). This pipeline specifies to forward the packet to the logical DHCP port of the logical switch (e.g., since the packet is a broadcast packet and this port is one of the ports on the logical switch). The pipeline then identifies MFE3 that executes on the edge node 325 as the MFE that performs the forwarding processing for the logical DHCP port of the logical switch (i.e., LDS1 port implemented on MFE shown in FIG. 3).

The second stage 410 shows that MFE2 has identified the gateway machine 325 as the machine that hosts MFE3 which implements the logical DHCP port of the logical switch. As such, MFE2 encapsulates the packet 435 with the required data to send the packet to MFE3 that runs on the identified gateway machine 325 (e.g., MFE2 adds its own IP address to the outer packet header as the source VTEP and the IP address of MFE3 as the destination VTEP). In some embodiments, in order to identify the different source and destination VTEPs by the MFEs, the configuration data that the management plane (e.g., a manager in the management cluster) distributes to the MFEs includes forwarding data that defines how to set up tunnels between the MFEs. For instance, the configuration data specifies the location (e.g., IP address) of each MFE as a virtual tunnel endpoint (VTEP). The different MFEs receive the tunnel endpoint addresses of the other MFEs that implement the logical forwarding elements from the CCP cluster and store these addresses in the MFEs' corresponding VTEP tables. The MFEs then use these VTEP tables to establish tunnels between each other.

In some embodiments, each source VTEP (e.g., the VTEP that sends the network data to a destination VTEP) uses its corresponding VTEP table data to encapsulate the packets received form a source VM. The source VTEP encapsulates the packets using a particular tunnel protocol (e.g., VXLAN protocol), and forwards the packets towards the destination VTEP. The destination VTEP then decapsulates the packets using the same particular tunnel protocol and forwards the packets towards a destination VM.

The third stage 415 shows that MFE3 on the gateway machine 325 receives the packet 435, decapsulates it (i.e., removes the tunneling data in the outer header of the packet), and identifies the DHCP server module 315 based on the logical context information in the packet as well as the destination MAC address that corresponds to the DHCP server module 315. However before sending the packet to the DHCP server module, MFE3 adds logical network data to the packet. At this point, since the managed forwarding element MFE3 knows that the packet is received from a logical port of the logical switch 305 that belongs to a particular logical network (e.g., with a LNI value of LNI-1), the MFE3 inserts the logical network identifier to the packet. As shown in this stage, the packet 440 now includes additional identification information (e.g., in the payload of the packet) to identify the logical switch and network from which the packet is received.

As described above, the MFE3 inserts the logical network identifier (LNI) to a particular sub-option field (e.g., Circuit ID sub-option, Remote ID sub-option, etc.) of a particular DHCP option (e.g., DHCP option 82) of the DHCP packet 440 in some embodiments. In some embodiments, the MFE3 inserts the LNI in one sub-option field (e.g., Circuit ID) and an identifier value for the logical switch 305 in another sub-option field (e.g., Remote ID sub-option). This stage also shows that the DHCP server module 360 is connected to two databases 450 and 460. The first database 450 stores the DHCP configuration data for the first logical network that includes the logical switch 305, while the second database 460 stores the DHCP configuration data for the second logical network that includes the logical switch 310.

The fourth stage 420 illustrates that after the DHCP server module receives the packet 440, the module starts analyzing the packet to identify the DHCP database that should be used to retrieve the requested data. The DHCP server module 360 reads the inserted data in the packet and matches the data against a local table that includes all of the logical switches and networks identification information. This table is described in more detail below by reference to FIG. 6. After finding a match, the module retrieves the required data from a DHCP database that is in the matched record of the table.

As shown in the fourth stage 420, the DHCP server module has identified the DHCP database 450, which is highlighted in the figure, as the database that includes the required data for providing the requested DHCP service. For example, the module retrieves an IP address from an IP pool stored in this database for VM2 which requested an IP address. The module may also retrieve a static IP address from the database, e.g., when the MAC address of the requesting DCN dictates assignment of a static IP address. The DHCP server module ultimately sends the retrieved IP address to the requesting DCN.

Figure 5:
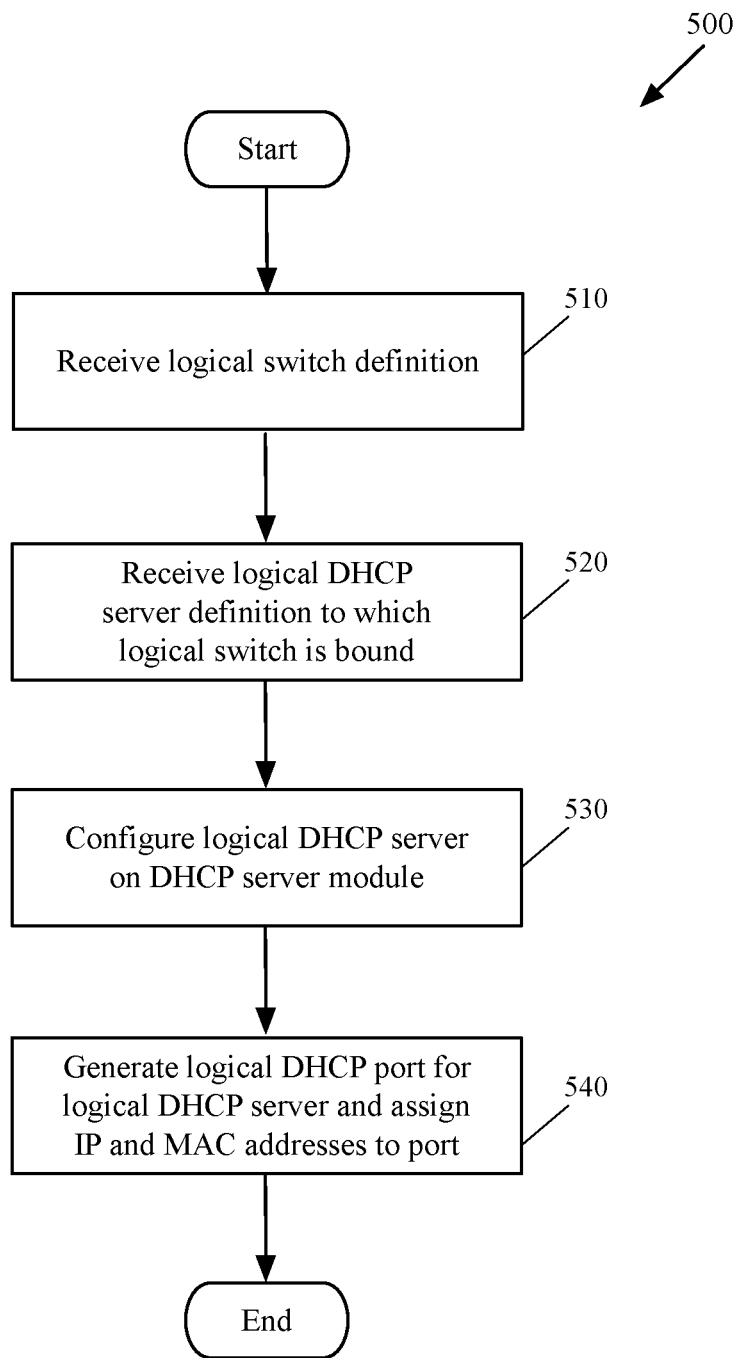
FIG. 5 conceptually illustrates a process of some embodiments for defining a DHCP profile and a logical DHCP server that uses this profile in order to provide DHCP services to one or more subnets of a logical network.

FIG. 5 conceptually illustrates a process 500 of some embodiments for generating a DHCP profile and a logical DHCP server that uses this profile in order to provide DHCP services to one or more subnets of a logical network. The process 500 is performed by a management plane (e.g., a manager machine, a manager process, etc.) in some embodiments. In some other embodiments, the process is performed by a combination of management and control planes of a hosting system.

The process starts by receiving (at 510) a definition of a logical switch. As described before, a user may define any new logical element such as a logical switch through API calls to the management plane. Next, the process receives (at 520) a definition of a logic DHCP server to which the logical switch is bound. That is, the user specifies the logical DHCP server, from which, the DCNs that are logically connected to the logical switch receive DHCP services. After receiving the definitions of the logical DHCP server and logical switch, the process of some embodiments configures (at 530) the DHCP server module to implement the logical DHCP server.

In order to define a new logical DHCP server, in some embodiments, the user first defines a DHCP profile the attributes of which can be shared by multiple logical DHCP servers. The DHCP profile attributes include, but are not limited to, a default gateway for the subnet, specification of the edge cluster (e.g., MAC/VTEP mappings of active and standby edge nodes in the edge cluster), commonly used DHCP parameters (e.g., domain name, lease period, etc.), static bindings, IP pools, etc.

In some embodiments the user then defines a new logical DHCP server by specifying the DHCP profile from which, the logical DHCP server inherits its attributes. The user may create, modify, or delete a logical DHCP server, the DHCP options for an IP pool that the logical DHCP server uses (if dynamic range is configured) or a particular DCN for the logical DHCP (if static binding is used), etc.

When a DHCP parameter (e.g., an IP pool) is defined for a logical DHCP server separately, that parameter takes precedence over a general parameter that is defined for the associated DHCP profile. For example, if the user defines a particular lease time (for IP address) for a logical DHCP server, when the DHCP server module specifies the lease time for a DCN's IP address, the module uses the particular lease time specified in the logical server definition and not the general lease time that is specified in the DHCP profile based on which the logical DHCP server is defined. In some embodiments, the management plane generates one or more DHCP configuration databases (e.g., stored in one or more edge nodes that implement the DHCP server modules) that keep the DHCP profile's data and logical servers' data for each logical network.

After configuring the logical DHCP server, the process generates (at 540) a new logical DHCP server port on the logical switch and assigns MAC and IP addresses to the generated logical port. That is, the process assigns a unique MAC and IP addresses to the logical DHCP port of the logical switch in order to couple the logical port to a physical DHCP server module executing on an edge node (e.g., a DHCP module in a service router that executes on the edge node). This unique MAC and OP addresses are associated with a DHCP server module that runs on an edge node or a host and will be shared by every logical DHCP server in some embodiments.

When a logical switch receives a DHCP packet from a DCN, the MFE that implements the logical switch's pipeline looks for the IP address of the DHCP port of the logical switch (e.g., kept in forwarding tables of the MFE). From the forwarding data, the MFE identifies the other MFE that implements the DHCP port of the logical switch (which executes on the edge node that implements the HDCP server module). As such, the packet will be forwarded (by the MFE that implements the logical switch on the host machine) to the proper DHCP server module. The process then ends.

The specific operations of the process 500 may not be performed in the exact order shown and described. The specific operations may not be performed in one continuous series of operations, and different specific operations may be performed in different embodiments. For example, some embodiments, first receive a logical DHCP server definition and configure the logical DHCP server on a physical DHCP server module. These embodiments then receive the logical switch's definition and assign the configured logical DHCP server to the logical switch. Additionally, one of ordinary skill in the art would realize that the process 500 could be implemented using several sub-processes, or as part of a larger macro process.

Figure 6:
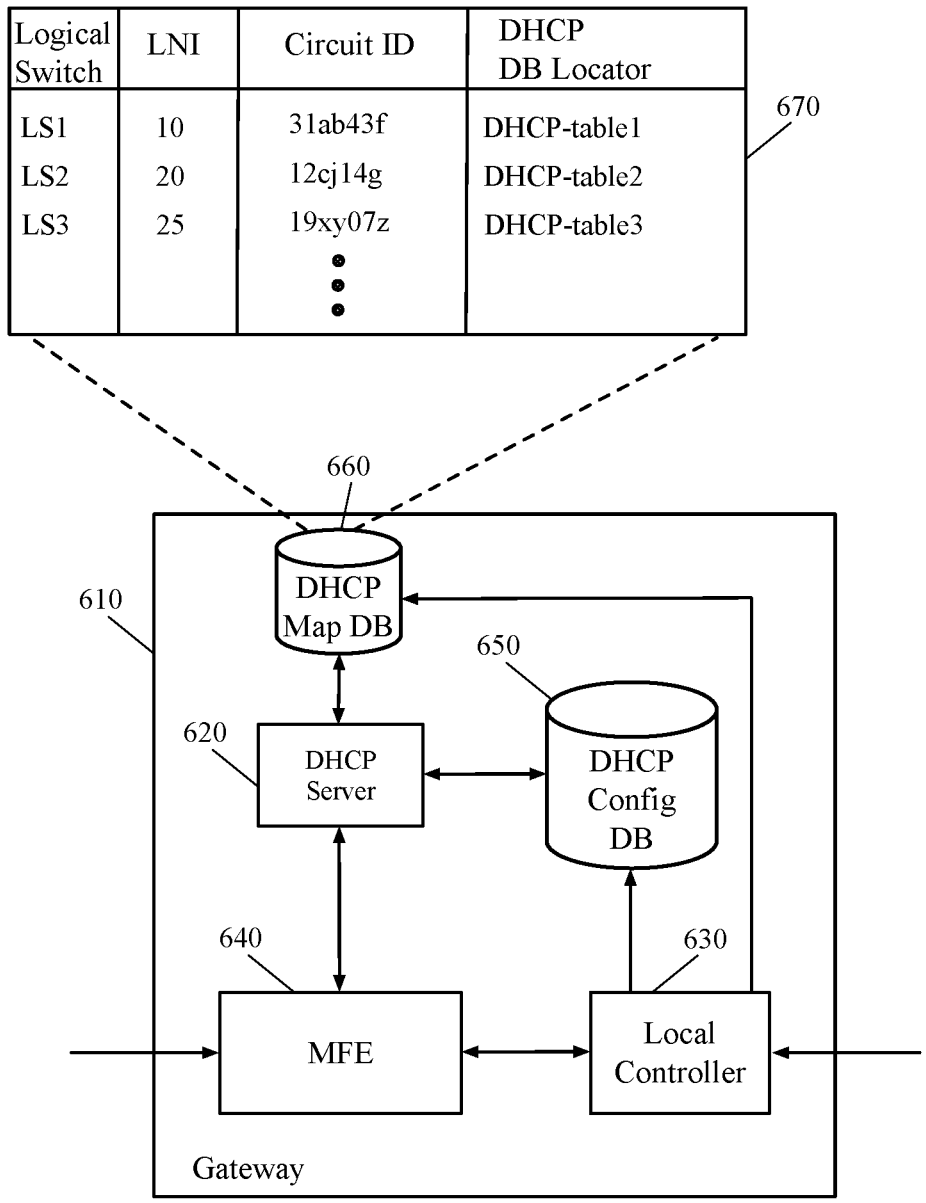
FIG. 6 conceptually illustrates an example block diagram of an edge node (e.g., a gateway machine) that implements a DHCP server module.

FIG. 6 conceptually illustrates an example block diagram of an edge node (e.g., a gateway machine) that implements a DHCP server module. The figure shows a gateway machine 610 that includes a DHCP server module 620, a local controller 630, an MFE 640, a DHCP configuration data storage 650, and a DHCP map data storage 660 that includes a map table 670. The local controller 630 receives a logical DHCP server's configuration data (from the CCP cluster) and stores this data (e.g., the IP pool of the DHCP server, the binding logical switch, the lease periods, etc.) in the DHCP configuration data storage 650. In some embodiments, the local controller 630 adds and/or updates the data in the mapping table 670 based on the forwarding and management data that the local controller receives from the controller cluster.

The DHCP server module 620 receives the required configuration data for each logical network from the data storage 650. The DHCP server module 620 also updates the data in the data storage 650 based on the requests that it receives and the services that it provides. For example, when a lease is handed out or renewed, the DHCP server module writes the lease information to a table of the data storage 650. The DHCP server module also updates the mapping data in the mapping table 670 at runtime.

When the MFE 640 on the edge node receives a DHCP packet, based on the logical switch from which the broadcast packet is received, inserts a unique identifier value to the packet (e.g., to a sub-option field of option 82). The identifier value is a universally unique identifier (UUID) that is global for all of the logical switches of the logical networks. In some embodiments, the inserted identifier is an identification value of the logical switch itself that is a global value as well. In some other embodiments, the inserted identifier is the logical network identifier that as unique between all logical networks. Yet, in some other embodiments, the MFE inserts both of the identification values of the logical switch and the logical network to the received DHCP packet.

The MFE 640 then sends the packet to the DHCP server module 620. The DHCP server module, based on the inserted identification value in the packet, identifies the logical DHCP server and logical switch from which the packet is received. In some embodiments, the DHCP server module 620 reads the identification value, e.g., that is stored in the circuit ID sub-option field in the packet, and compares this value against the mapping table 670. For instance, in the illustrated example, if the circuit ID value of the DHCP packet is "12cj14g," the DHCP server module realizes that the the packet is received from the logical switch LS2 in logical network 20. Based on this information the DHCP server module looks up the requested DHCP service in the related section of the data storage 650. For example, if a DCN that is connected the logical switch LS2 has sent an IP address request, the DHCP server module 620 looks up in the LS2 section's records (or the logical network 20 section) in the database, and pulls an IP address from the IP pool that is stored in that section.

After retrieving the service that was requested, the DHCP server module sends a DHCP service packet back to the requesting DCN (or relay agent), through the MFE of the edge node. That is, the module requesting DCN's MAC address as the destination MAC address to the packet and sends the packet to the edge node's MFE. The MFE in turn identifies the host machine that implements the logical switch and forwards (i.e., tunnels) the packet to the MFE of the host machine, which in turn forwards the packet with the new IP address to the DCN.

For better scalability, some embodiments assign a DHCP server module (and a standby module) to implement a set of logical DHCP servers that belongs to one or more logical networks. For example, when the number of logical switches in one logical network grows, or the number of logical networks surpasses a threshold, some embodiments add another DHCP module to handle the logical DHCP servers for the additional logical switches and/or networks.

A user may query the management plane for the status of a logical DHCP server in a logical network or the status of a physical DHCP server module that implements one or more logical DHCP servers. The queried status may include the IP pools' status, the lease information, etc., of one or more logical DHCP servers implemented by the DHCP server module. In some embodiments, the DHCP related states of the logical DHCP servers are reported to the user (through the management plane) upon occurrence of a particular event. For example, in some embodiments, the DHCP states of the logical DHCP servers are reported to one or more users each time a new logical router is added to a logical network. In some other embodiments the status is reported each time an edge node that implements a DHCP server module fails. Some other embodiments generate status reports periodically.

As described above, in some embodiments, a logical router that acts as a relay agent couples to a logical switch that is connected to a logical DHCP server and receives DHCP services. When the logical router also couples to another logical switch that is not connected to any logical DHCP server, the logical router can be configured to act as a relay agent and provide the DHCP services of the logical DHCP server to a set of DCNs connected to the other logical switch (i.e., the logical switch to which no logical DHCP server is coupled). When a logical router functions as a relay agent between two logical switches of the same logical network, some embodiments require the two logical switches to be on two different subnets of the logical network (i.e., two subnets that do not have overlapping IP address ranges).

Figure 7:
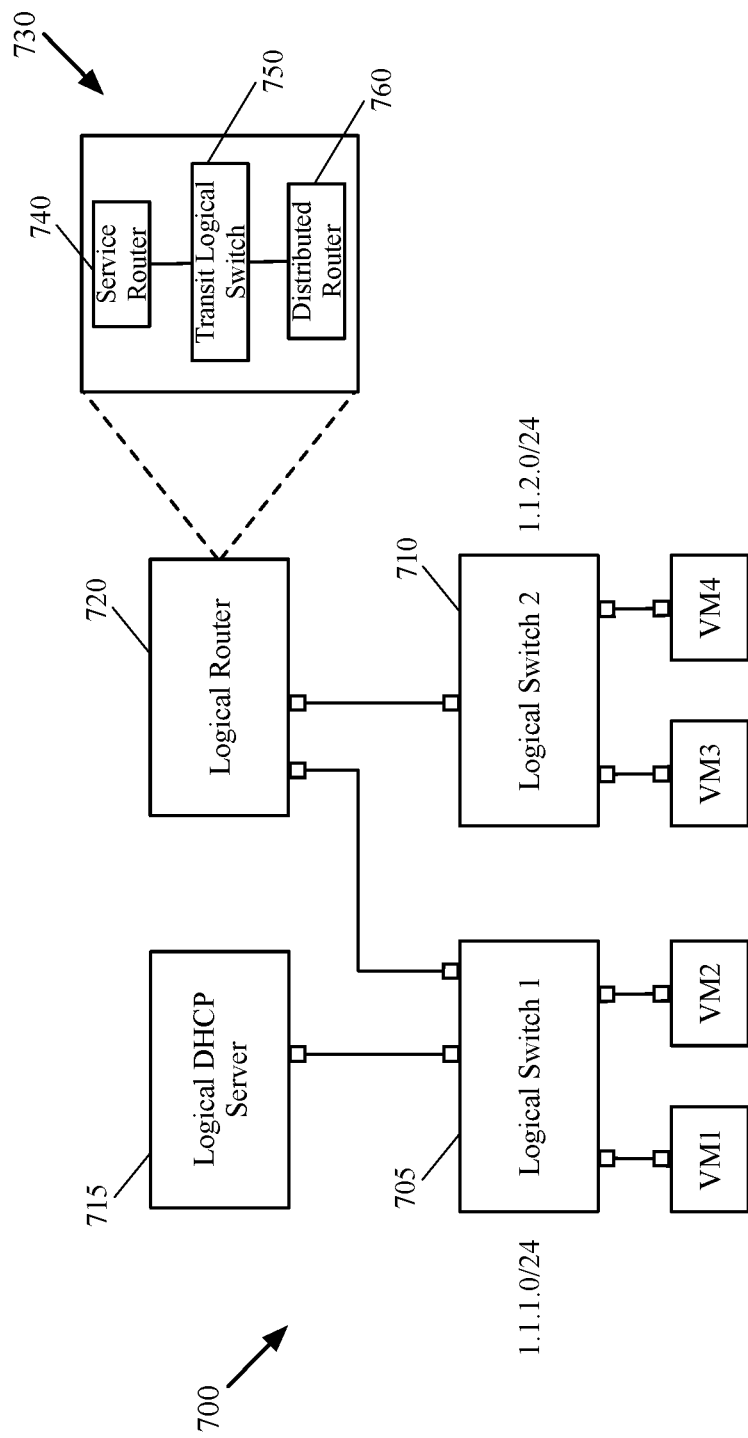
FIG. 7 illustrates a logical router that acts as a DHCP relay agent to provide DHCP services to a logical switch that is not bound to any logical DHCP server.

FIG. 7 illustrates a logical router that acts as a DHCP relay agent to provide DHCP services to a logical switch that is not bound to any logical DHCP server. More specifically, this figure shows a logical network 700 that includes two logical switches 705 and 710 of a logical network that logically connect four DCNs VM1-V4 to each other (and to other DCNs). The logical switch 705 is also connected to a logical DHCP server 715 which provides DHCP services to DCNs VM1 and VM2. However, the logical switch 710 is not connected to any logical DHCP server and instead is logically coupled to the logical router 720. The logical router 720 is also couple to a logical port of the first logical switch 705. As such, the logical router can act as a DHCP relay agent that relays the DHCP requests coming from the second logical switch 710 to the logical DHCP server 715 and also relays the DHCP services of the logical DHCP server to the DCNs that are coupled to logical switch 710 (i.e., VM3 and VM4).

As shown in the figure, the first logical switch has a first subnet address (i.e., 1.1.1.0/24) assigned to it, while the second logical switch has a second, different subnet address (i.e., 1.1.2.0/24) assigned to it. This is because the two logical switches belong to a same logical network. In some embodiments, a relay agent (i.e., logical router), may not connect to subnets that have overlapping IP address ranges.

In some embodiments a user (e.g., tenant of the datacenter) defines a logical router for the logical network through the management plane. That is, the user makes one or more API calls to a manager of the network to define the logical router. The management plane then generates and pushes the configuration data for the defined logical router to the control plane. The control plane of some embodiments, after receiving the configuration data of the logical router, creates a single distributed routing component (also referred to as a distributed router (DR)) and one or more service routing components (also referred to as service routers (SRs)).

The DR, in some embodiments, spans managed forwarding elements (MFEs) that couple directly with virtual machines (VMs) or other data compute nodes that are logically connected, directly or indirectly, to the logical router. The DR of some embodiments also spans the gateways to which the logical router is bound. The DR of some embodiments is responsible for first-hop distributed routing between logical switches and/or other logical routers that are logically connected to the logical router.

The service routers (SRs) of some embodiments are responsible for delivering services that are not implemented in a distributed fashion (e.g., some stateful services) as well as connecting the logical network to external network(s). As described above, some embodiments implement the DHCP server module as part of the service router of the logical router. A distributed logical router will have SRs if either (i) the logical router is a provider logical router (PLR), and therefore connects to external physical networks or (ii) the logical router has services configured that do not have a distributed implementation (e.g., NAT, load balancing, DHCP in some embodiments). Even if there are no stateful services configured on a PLR, some embodiments use SRs for failure handling and for ECMP.

Logical routers, in some embodiments, can be viewed from three different perspectives. The first of these views is the API view, or configuration view, which is how the user (e.g., a datacenter provider or tenant) views and defines the logical router. The logical router 720 is how the user views the logical router in the logical network. The second view is the control plane or management plane view, which is how the controller computer internally defines the logical router. Finally, the third view is the physical realization, or implementation of the logical router, which is how the logical router is actually implemented in the physical network.

The control/management plane view 730 of the logical router 720 shows that the control plane has generated a service router 740, a transit logical switch 750, and a distributed router 760 for the logical router. The transit logical switch 210 has different logical ports for each of the created routers, and each of the routing components 740 and 760 has an interface to logically connect to the transit logical switch 750. In the physical implementation (not shown), the service router 740, as stated, is implemented on a gateway machine, while the transit logical switch 750 and the distributed router 760 are implemented across all of the host machines and gateway machines of the logical network.

As such, when the virtual machine VM3 sends a DHCP packet requesting an IP address, the MFE of the host machine that implements the logical port of the logical switch 710, which is coupled to the DR 760, catches the packet. Since the packet is a DHCP broadcast packet, the DR 760 pipeline realizes that the packet should be sent to the logical switch 705 which is connected to the logical DHCP server. After performing the forwarding functionalities for the logical switch 710 and DR 760, the MFE forwards (i.e., tunnels) the packet to the MFE that implements the port of logical switch 710 that is coupled to the logical DHCP server 715. The DHCP packet then is forwarded to a gateway machine that implements the corresponding DHCP server module (e.g., that is implemented by the SR 740, or another SR of another logical router).

Figure 8:
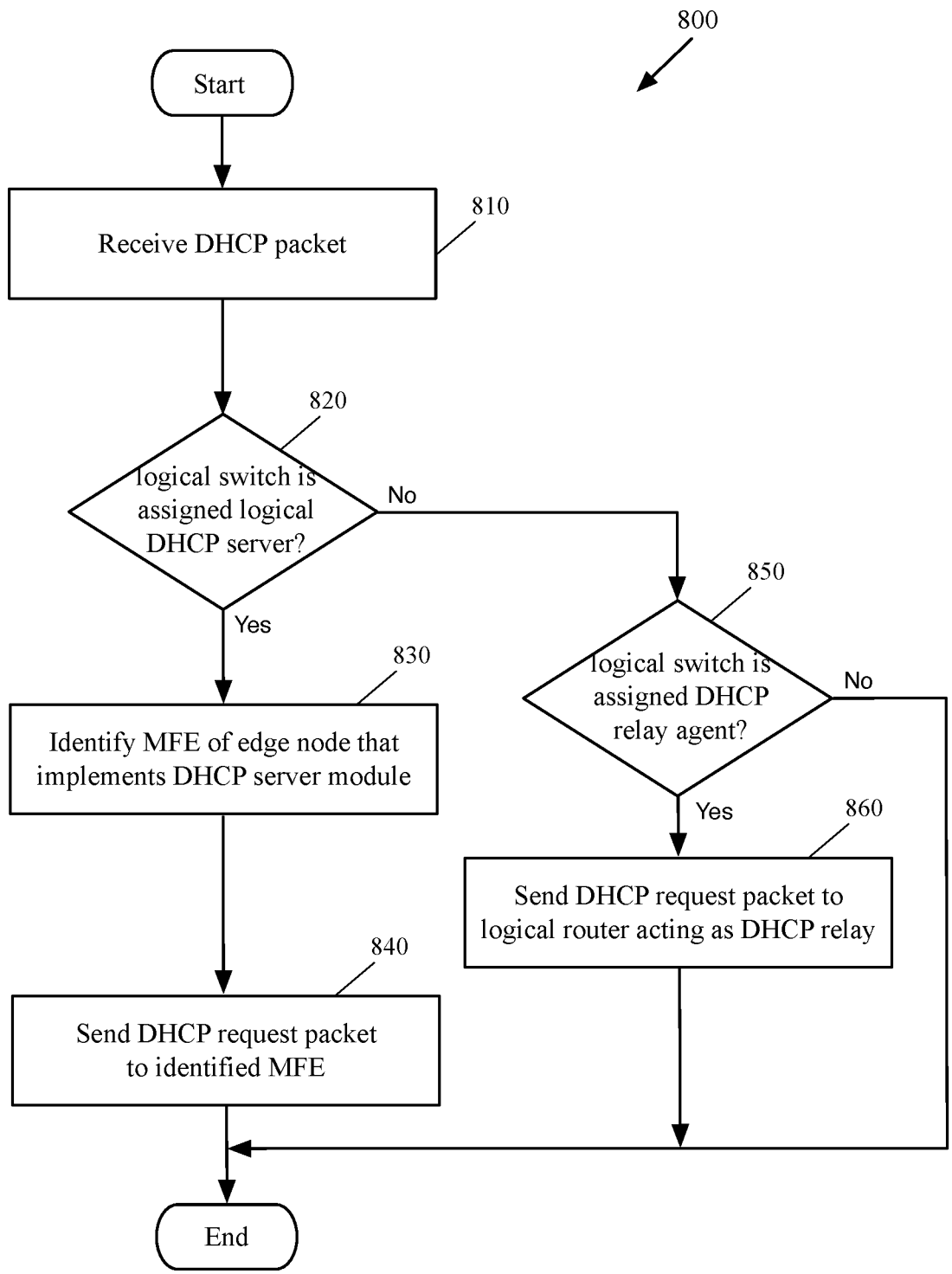
FIG. 8 conceptually illustrates a process of some embodiments that receives a DHCP packet from a data compute node and processes the packet.

FIG. 8 conceptually illustrates a process 800 of some embodiments that receives a DHCP packet from a data compute node and processes the packet. In some embodiments the process is performed by a managed forwarding element. The managed forwarding element executes on an edge node in some embodiments. In some other embodiments the managed forwarding element executes on a host machine.

The process starts by receiving (at 810) a DHCP packet from a data compute node (e.g., a virtual machine that runs on a host machine). As described above, the packet can be a DHCP discovery request (e.g., when the virtual machine starts operating on the host machine) or any other DHCP service request (e.g., a lease renewal request). The broadcast packet, as described above, is received at a logical port of a logical switch that is coupled to the requesting DCN.

The process then determines (at 820) whether the logical switch that receives the DHCP packet is bound to a logical DHCP server or not. In other words, the process determines whether a user has defined a logical DHCP server associated with the logical switch or not. The process of some embodiments makes such a determination by determining whether a logical DHCP server port is defined and created for the logical switch.

When the process determines that the logical switch is bound to a logical DHCP server, the process identifies (at 830) the tunnel endpoint to which the DHCP packet should be forwarded. In some embodiments, the process identifies the tunnel endpoint by identifying the IP address that is assigned to the logical DHCP server. This IP address is in fact the IP address of a managed forwarding element that runs on the same gateway machine on which the DHCP server module executes.

After identifying the MFE, the process of some embodiments sends (at 840) the DHCP packet to the identified MFE. As described above, the process encapsulates the packet with the required tunneling data and tunnels the packet to the edge node MFE. The process then ends. However, if the process determines that the logical switch is not bound to any logical DHCP server, the process determines (at 850) whether the logical switch is bound to a DHCP relay logical router. When the process determines that the logical switch is not coupled to such a logical router, in some embodiments, the process returns an error. In some other embodiments, the process drops the DHCP packet. The process then ends.

On the other hand, if the process determines that the logical switch is logically connected to a logical router, the process forwards the packet to the relay agent for further processing the packet. As described above by reference to FIG. 7, forwarding the packet to the logical router in some embodiments, includes sending the packet from the logical switch's pipeline to the DR's pipeline both of which execute on the same managed forwarding element that is connected to the requesting DCN. In the aforementioned figure, we have discussed how the packet is eventually sent to the edge node for DHCP processing. The process then ends.

The specific operations of the process 800 may not be performed in the exact order shown and described. The specific operations may not be performed in one continuous series of operations, and different specific operations may be performed in different embodiments. Additionally, one of ordinary skill in the art would realize that the process 800 could be implemented using several sub-processes, or as part of a larger macro process.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
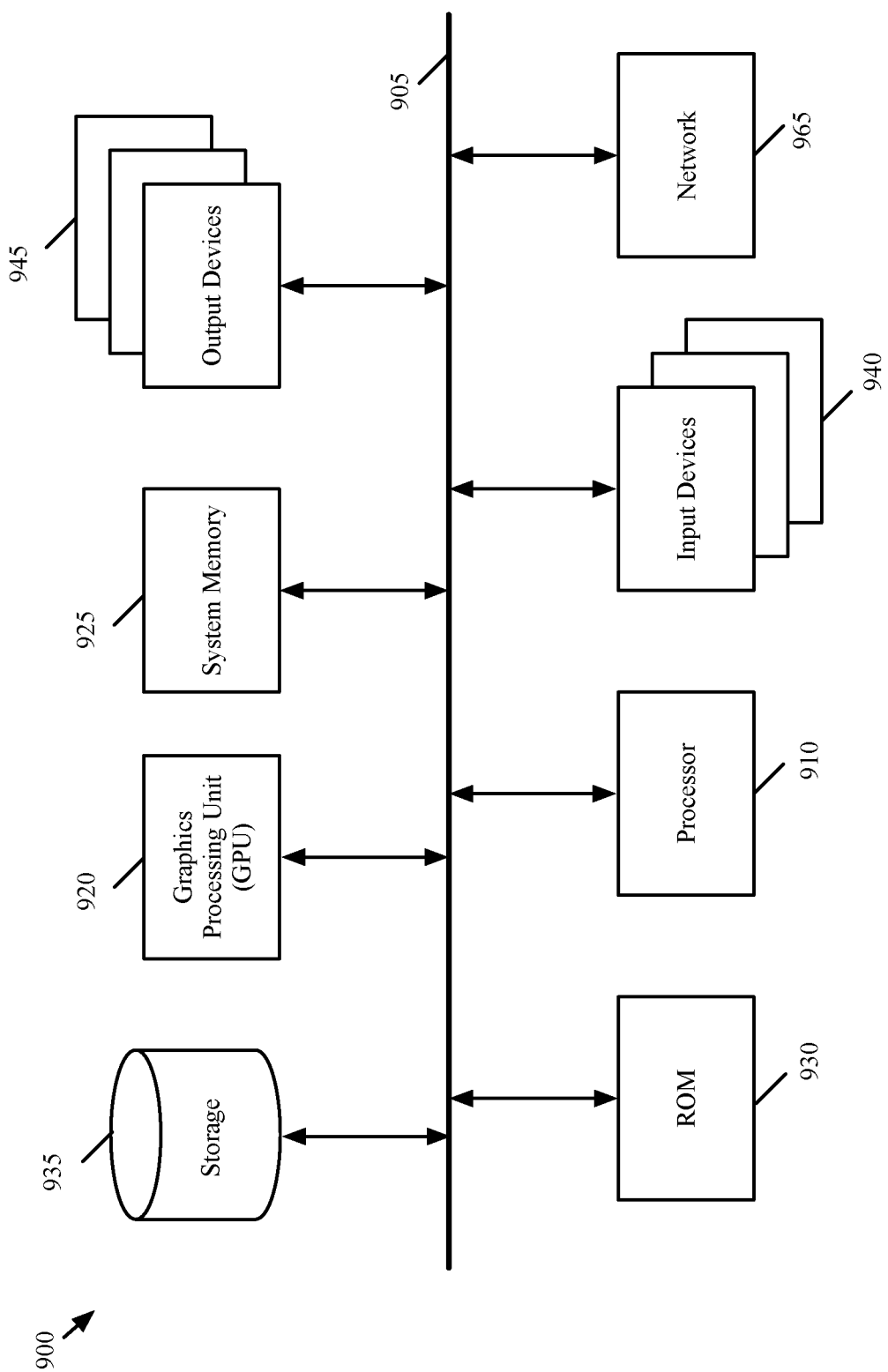
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash memory device, etc., and its corresponding drive) as the permanent storage device. Like the permanent storage device 935, the system memory 925 is a read-and-write memory device. However, unlike storage device 935, the system memory 925 is a volatile read-and-write memory, such a random access memory. The system memory 925 stores some of the instructions and data that the processor needs at runtime. In some embodiments, the invention's processes are stored in the system memory 925, the permanent storage device 935, and/or the read-only memory 930. From these various memory units, the processing unit(s) 910 retrieves instructions to execute and data to process in order to execute the processes of some embodiments.

The bus 905 also connects to the input and output devices 940 and 945. The input devices 940 enable the user to communicate information and select commands to the electronic system. The input devices 940 include alphanumeric keyboards and pointing devices (also called "cursor control devices"), cameras (e.g., webcams), microphones or similar devices for receiving voice commands, etc. The output devices 945 display images generated by the electronic system or otherwise output data. The output devices 945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Additionally, the term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIGS. 5 and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for providing dynamic host configuration protocol (DHCP) services for a plurality of logical networks, the method comprising:

at a first software forwarding element (SFE) executing on a first computer to implement first gateway between a first logical network and an external network outside of the first logical network:

receiving, from a managed forwarding element that implements a logical forwarding element of the first logical network, a DHCP packet requesting an internet protocol (IP) address for a first machine associated with the first logical network;

forwarding the DHCP packet with an identifier for the first logical network to a shared DHCP server executing on the first computer to provide IP addresses for a plurality of machines in the first logical network, said shared DHCP server performing DHCP operations for the plurality of logical networks and using the provided identifier to identify the first logical network and provide an IP address from a first IP address pool associated with the identified first logical network for the first machine;

obtaining, from the shared DHCP server, the requested IP address for the DHCP packet; and forwarding the IP address in a DHCP response to a source of the DHCP packet, wherein the first computer executes a plurality of SFEs each of which (i) is associated with a different logical network, (ii) implements a gateway between the SFE's associated logical network and the external network, and (iii) performs said receiving, forwarding, and obtaining operations to process DHCP packets, to obtain IP addresses from the shared DHCP server for the processed DHCP packets, and to forward DHCP responses for the processed DHCP packets of the SFE's associated logical network.

2. The method of claim 1, wherein the plurality of machines is a first plurality of machines, the shared DHCP server provides IP addresses for a second plurality of machines associated with a second logical network, and the shared DHCP server uses the identifier for the first logical network (i) to identify the first logical network associated with a first data compute node (DCN) and (ii) to select the IP address for the first machine from the first IP address pool.

3. The method of claim 2, wherein for the second logical network, the shared DHCP server uses a second IP address pool that overlaps with the first IP address pool.

4. The method of claim 2, wherein the identifier for the first logical network is inserted into a particular sub-option field of a particular DHCP option in a payload of the DHCP packet.

5. The method of claim 1, wherein the shared DHCP server retrieves the requested IP address from a database in which a plurality of IP pools for the plurality of logical networks are stored, wherein the IP address is provided when the identifier for the first logical network matches a table of the database that contains the IP pool of the first logical network.

6. The method of claim 1, wherein the received and forwarded DHCP packet is a broadcast packet.

7. The method of claim 1, wherein the first logical network comprises a plurality of logical switches each of which connects a different set of machines of the first logical network, wherein the identifier for the first logical network identifies a particular logical switch associated with the first machine.

8. The method of claim 7, wherein a first logical switch is associated with a first subnet that has a first IP address range, and a second logical switch is associated with a second different subnet that has a second IP address range.

9. The method of claim 8, wherein
the first and second IP addresses ranges comprise one or more overlapping IP addresses and
the shared DHCP server assigns a same IP address from the overlapping IP addresses to both of the first DCN and a second DCN.

10. The method of claim 1, wherein the SFE is a managed forwarding element that implements first and second gateways for first and second logical networks.

11. The method of claim 1, wherein the logical forwarding element of the first logical network comprises a logical switch.

12. The method of claim 1, wherein the logical forwarding element of the first logical network comprises a logical router.

13. A non-transitory machine readable medium storing a first software forwarding element (SFE) which when executed by at least one processing unit of a first computer implements a gateway between each of a plurality of logical networks and an external network outside of each logical network, the first SFE facilitating dynamic host configuration protocol (DHCP) services for the plurality of logical networks, the first SFE comprising sets of instructions for:

receiving a plurality of DHCP packets each requesting an internet protocol (IP) address for a different machine associated with a different particular logical network that is identified by a logical network identifier, each DHCP packet received from a managed forwarding element that implements a logical forwarding element of that particular logical network;

inserting in each DHCP packet the logical network identifier of the DCHP packet's associated particular logical network and forwarding the DHCP packet with the inserted logical network identifier to a shared DHCP server used for all of the plurality of logical networks and executing on the first computer to provide IP addresses for a plurality of machines in the particular logical network, said shared DHCP server performing DHCP operations for the plurality of logical networks and using the logical network identifier to identify the particular logical network and provide an IP address from a particular IP address pool associated with the identified particular logical network for the machine for which the IP address is requested;

obtaining the requested IP address for each DHCP packet; and forwarding each obtained IP address in a DHCP response to a source of the DHCP packet for which the IP address was obtained.

14. The non-transitory machine readable medium of claim 13, wherein the plurality of machines is a first plurality of machines and the particular logical network is a first logical network, the shared DHCP server provides IP addresses for a second plurality of machines associated with a second logical network, and the shared DHCP server uses the logical network identifier (i) to identify the particular logical network associated with a first data compute node (DCN) and (ii) to select the IP address for the machine from the first IP address pool.

15. The non-transitory machine readable medium of claim 14, wherein for the second logical network, the shared DHCP server uses a second IP address pool that overlaps with the first IP address pool.

16. The non-transitory machine readable medium of claim 14, wherein the logical network identifier for the particular logical network is inserted into a particular sub-option field of a particular DHCP option in a payload of the DHCP packet.

17. The non-transitory machine readable medium of claim 13, wherein the shared DHCP server retrieves the requested IP address from a database in which a plurality of IP pools for the plurality of logical networks are stored, wherein the IP address is provided when the logical network identifier for the particular logical network matches a table of the database that contains the IP pool of the particular logical network.

18. The non-transitory machine readable medium of claim 13, wherein each of the received and forwarded DHCP packets is a broadcast packet.

19. The non-transitory machine readable medium of claim 13, wherein the particular logical network comprises a plurality of logical switches each of which connects a different set of machines of the particular logical network, wherein the logical network identifier for the particular logical network identifies a particular logical switch associated with the machine.

20. The non-transitory machine readable medium of claim 19, wherein a first logical switch is associated with a first subnet that has a first IP address range, and a second logical switch is associated with a second different subnet that has a second IP address range.

21. The non-transitory machine readable medium of claim 20, wherein
 the first and second IP addresses ranges comprise one or more overlapping IP addresses and
 the shared DHCP server assigns a same IP address from the overlapping IP addresses to both of the first DCN and a second DCN.

22. The non-transitory machine readable medium of claim 13, wherein the SFE is a managed forwarding element that implements first and second gateways for first and second logical networks.

* * * * *